US009372673B2

(12) United States Patent  
Bertilsson et al.

(10) Patent No.: US 9,372,673 B2  
(45) Date of Patent: Jun. 21, 2016

(54) SYSTEMS AND METHODS FOR CREATING USER INTERFACES FOR GUIDING THE CREATION OF MODELING APPLICATIONS FOR FORMING AND SOLVING PROBLEMS IN A MULTIPHYSICS MODELING SYSTEM

(71) Applicant: Comsol AB, Stockholm (SE)

(72) Inventors: Daniel Bertilsson, Vallentuna (SE); Erik Danielsson, Vaellingby (SE); Sara Ehrlund, Eskilstuna (SE); Eduardo Fontes, Vallentuna (SE); Lars Langemyr, Stockholm (SE); Victor Littmarck, Solna (SE); Svante Littmarck, Dedham, MA (US); Nils Malm, Lidingö (SE); Tomas Normark, Bromma (SE); Björn Sjödin, Lexington, MA (US)

(73) Assignee: Comsol AB, Stockholm (SE)

( * ) Notice: Subject to any disclaimer, the term of this patent is extended or adjusted under 35 U.S.C. 154(b) by 0 days.

(21) Appl. No.: 14/852,352

(22) Filed: Sep. 11, 2015

(65) Prior Publication Data

US 2016/0077810 A1    Mar. 17, 2016

Related U.S. Application Data

(60) Provisional application No. 62/050,014, filed on Sep. 12, 2014.

(51) Int. Cl.  
*G06F 9/44*    (2006.01)

(52) U.S. Cl.  
CPC ... *G06F 8/34* (2013.01); *G06F 8/35* (2013.01)

(58) Field of Classification Search  
None  
See application file for complete search history.

(56) References Cited

U.S. PATENT DOCUMENTS

| 7,519,518 | B2 | 4/2009 | Langemyr |
| 7,596,474 | B2 | 9/2009 | Langemyr |
| 7,623,991 | B1 | 11/2009 | Langemyr |
| 8,019,579 | B1 | 9/2011 | Wey |

(Continued)

FOREIGN PATENT DOCUMENTS

WO    WO 2014/100727    6/2014

OTHER PUBLICATIONS

International Search Report, PCT/US2015/049808, mailed Dec. 8, 2015, 4 pages.

(Continued)

*Primary Examiner* — Chuck Kendall  
(74) *Attorney, Agent, or Firm* — Nixon Peabody LLP

(57) ABSTRACT

Systems and methods generate a modified application data structure that provides a customized modeling of physical systems in response to customized user inputs received via application feature(s) for new window form(s). The modified application data structure is generated from guided user inputs received through application builder wizard graphical user interface(s). The systems and methods include embedding a multiphysics model data structure in an initial application data structure and defining new window form(s). Window form data representing the defined new window forms is added to the initial application data structure. User-selectable application feature options are displayed in the application builder wizard graphical user interface(s) and application feature data is added to the initial application data structure to create a modified application data structure. The added application features can include data representing widget(s), form feature(s), and command sequence(s).

27 Claims, 25 Drawing Sheets

(56) References Cited

U.S. PATENT DOCUMENTS

| | | |
|---|---|---|
| 8,219,373 B2 | 7/2012 | Fontes |
| 8,626,475 B1 | 1/2014 | Fontes |
| 2004/0255269 A1 | 12/2004 | Santori |
| 2009/0327930 A1* | 12/2009 | Argue ..................... G06F 8/10 715/763 |
| 2012/0179426 A1 | 7/2012 | Fontes |
| 2014/0047407 A1 | 2/2014 | Danielsson |

OTHER PUBLICATIONS

Written Opinion of the International Searching Authority, PCT/US2015/049808, mailed Dec. 8, 2015, 7 pages.

\* cited by examiner

Figure 5

SYSTEMS AND METHODS FOR CREATING USER INTERFACES FOR GUIDING THE CREATION OF MODELING APPLICATIONS FOR FORMING AND SOLVING PROBLEMS IN A MULTIPHYSICS MODELING SYSTEM

CROSS-REFERENCE TO RELATED APPLICATIONS

This application claims priority to and the benefits of U.S. Provisional Application No. 62/050,014, filed on Sep. 12, 2014, the disclosure of which is hereby incorporated by reference herein in its entirety.

FIELD OF THE INVENTION

The present invention relates generally to systems and methods for modeling and simulation, and more particularly, to systems and methods for providing user-selectable options to guide the creation of application data structures for forming and solving problems in a multiphysics modeling system.

BACKGROUND

Computer modeling systems are used to develop product designs and can include graphical user interfaces. Computer modeling systems may be complemented with packages analyzing a single aspect of a design, such as, structural analysis. It would be desirable to have an improved multiphysics modeling system for developing designs that include user interfaces for customizing environments adapted to specific uses.

SUMMARY OF THE INVENTION

According to one aspect of the present disclosure, a system is adapted to generate a modified application data structure for modeling physical systems. The modified application data structure is generated from guided user inputs received through one or more application builder wizard graphical user interfaces. The system comprises one or more modeling system processing units, one or more user input devices, optionally a display device, and one or more memory devices. The one or more modeling processing units are adapted, during use, to embed a pre-determined or a user-selected multiphysics model data structure in an initial application data structure. The multiphysics model data structure comprises data representing one or more models of physical systems. Each model of a physical system represents physical phenomena and/or physical processes. The multiphysics model data structure further comprises data representing at least one modeling operation for determining how to model or simulate the one or more models of physical systems. One or more new window forms are defined. In response to defining the one or more new window forms, window form data is added representing the defined one or more new window forms to the initial application data structure. One or more selections are received for application features from one or more user-selectable application feature options displayed in one or more of the application builder wizard graphical user interfaces. In response to receiving the one or more selections, application feature data are added corresponding to the received one or more selections. The application feature data represents one or more application features for the one or more new window forms. The application feature data is added to the initial application data structure to create a modified application data structure that further includes the window form data. Each added application feature comprises one or more of (i) first data representing at least one widget included in at least one of the new window forms, (ii) second data representing at least one form feature included in at least one of the new window forms, and/or (iii) third data representing at least one command sequence initiated through the at least one widget included in at least one new window form. The at least one form feature comprises one or more fields for specifying input data and/or output data and/or presentation format of input and/or output data. A command sequence comprises data specifying a sequence of operations to be carried out when executing an application defined by the modified application data structure. The at least one widget is linked to the command sequence such that selection of the at least one widget, during execution of the application, is operable to initiate the command sequence. The command sequence includes execution of at least one operation for the one or more models of physical systems defined in the embedded multiphysics model data structure. A modified application data structure is generated and stored in the one or more memory devices. The generated modified application data structure provides, when executed, a customized modeling of the physical systems in response to customized user inputs received via the one or more new window forms and the one or more application features for the one or more new window forms.

According to another aspect of the present disclosure, a computer-implemented method generates a modified application data structure for modeling physical systems in a multiphysics modeling system. The modified application data structure is generated from guided user inputs received through one or more graphical user interfaces customized using an application builder wizard. The method comprises embedding, via one or more modeling system processing units, a pre-determined or user-selected multiphysics model data structure in an initial application data structure. The multiphysics model data structure comprises data representing one or more models of physical systems. Each model of a physical system represents physical phenomena and/or physical processes. The multiphysics model data structure further comprises data representing at least one modeling operation for determining how to model or simulate the one or more models of physical systems. In response to an input received via one or more user input devices, one or more new window forms are defined. In response to defining the one or more new window forms, window form data representing the defined one or more new window forms is added to the initial application data structure via at least one of the one or more modeling system processing units. One or more selections are received, via at least one of the one or more input devices, for application features from one or more user-selectable application feature options displayed in one or more of the application builder wizard graphical user interfaces. In response to receiving the one or more selections, application feature data corresponding to the received one or more selections is added via at least one of the one or more processing units. The application feature data represents one or more application features for the one or more new window forms. The application feature data is added to the initial application data structure to create a modified application data structure that further includes the window form data. Each added application feature comprises one or more of (i) first data representing at least one widget included in at least one of the new window forms, (ii) second data representing at least one widget collection included in at least one of the new window forms, (iii) third data representing at least one form feature included in at least one of the new window forms, (iv) fourth data representing at least one form collection feature included in at least one of the new window forms and/or (v) fifth data representing at least one command sequence initiated through the new window form. The at least one form feature or the at least one form collection feature comprises one or more fields for specifying input data and/or output data and/or presentation format of input and/or output data. The command sequence comprises data specifying a sequence of operations to be carried out when executing an application defined by the modified application data structure. The at least one widget or widget collection is linked to the command sequence such that selection of the at least one widget or widget collection, during execution of the application, is operable to initiate a command sequence. The command sequence includes execution of at least one operation for the one or more models of physical systems defined in the embedded multiphysics model data structure. The modified application data structure is generated via at least one of the one or more modeling processing units. The generated modified application data structure is stored on one or more memory devices of the multiphysics modeling system. The generated modified application data structure provides, when executed, a customized modeling of the physical systems in response to customized user inputs received via one or more new window forms and one or more application features for the one or more new window forms.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 5 illustrates a graphical user interface for adding an application feature that includes adding a new form to an application data structure according to aspects of the present disclosure.

Figure 1A:
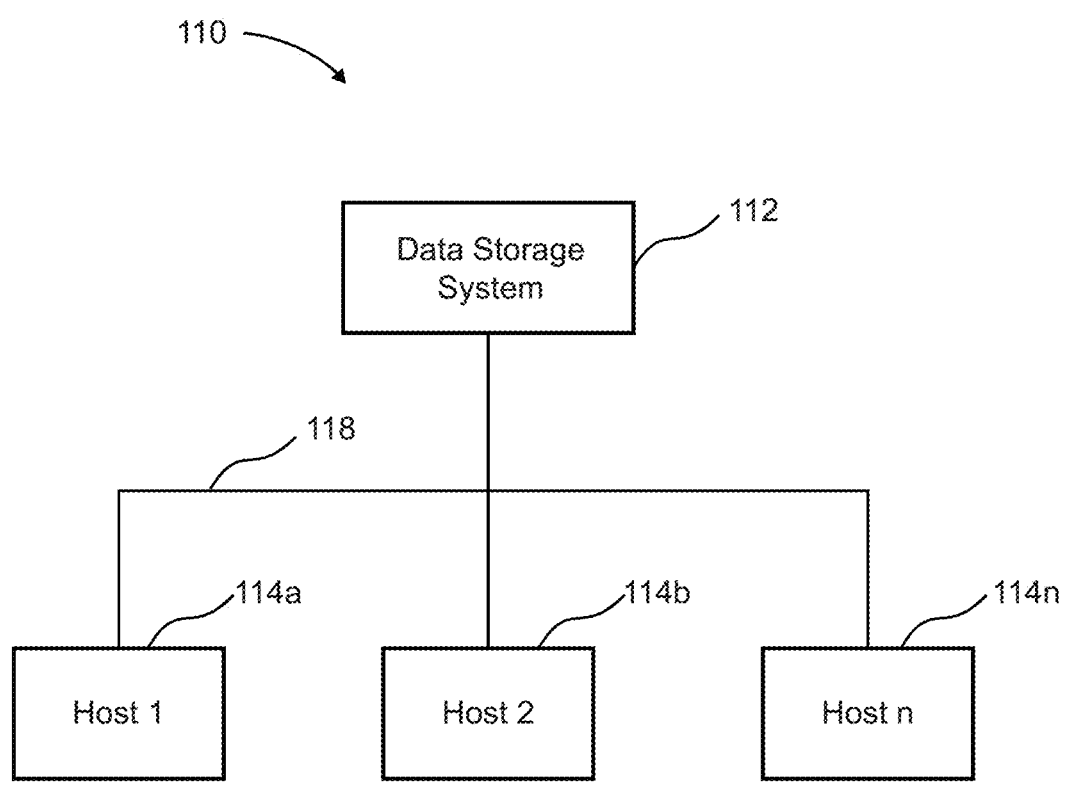
FIG. 1A-1C illustrate exemplary aspects of computer and server systems for creating user interfaces for guiding the creation of applications for forming and solving problems in a multiphysics modeling system according to aspects of the present disclosure.

While the present disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred aspects of the invention with the understanding that the present disclosure is to be considered as an exemplification of the principles of the invention and is not intended to limit the broad aspect of the invention to the aspects illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation."

Exemplary methods and systems are described for an application builder wizard that automates and simplifies complex tasks associated with creating a modeling application and the corresponding application data structure. The application builder wizard provides an efficient system that guides a user through a series of user-selectable options, displayed in one or more application builder wizard graphical user interfaces the selections of which are subsequently used to build an application data structure for modeling applications of complex multiphysics systems. The application data structure is used during the execution of applications that are based on a multiphysics model. In some aspects, modeling applications are based on existing multiphysics models that are embedded in application data structures.

It may be desirable for the application builder wizard described herein to be available to a modeling system user when the user of the multiphysics modeling system saves a multiphysics model as an application. It is also contemplated that it would be desirable to use an application data structure created by an application builder wizard in an application interface builder system (e.g., see Application Builder available from COMSOL, Inc. in COMSOL Multiphysics v4.4 and later versions for creating applications based on multiphysics models), such as the systems described in U.S. Patent Publication No. 2014/0047407, published on Feb. 13, 2014, and International Publication No. WO 2014/100727 A1, published Jun. 26, 2014, the disclosures of which are incorporated by reference herein in their entireties. Through the application builder wizard described by the present disclosure, an application data structure can be created and/or modified by adding forms, widgets, sequences of operations, methods, and/or events.

Multiphysics modeling systems as contemplated by the present disclosure include such systems as COMSOL Multiphysics® Version 4.4 and other versions, that are available from COMSOL, Inc. of Burlington, Mass., USA, and the multiphysics modeling systems described in U.S. Pat. Nos. 7,596,474 and 8,626,475, the disclosures of which are incorporated by reference herein in their entireties. Multiphysics modeling systems include features for setting up and solving multiphysics problems for simulations that include a plurality of coupled physical phenomena. The systems provide for receiving inputs in the form of physical properties that may be expressed in terms of physical quantities. The modeling system can further provide for setting up problems using physical properties, physical quantities, and physical phenomena described using partial differential equations (PDEs). The described multiphysics modeling system include features setting up and solving multiphysics problems using predefined physics interfaces, which are also referred to as application modes in U.S. Pat. No. 7,596,474. In addition, the described multiphysics modeling systems include PDE interface, also referred to as PDE modes, where a predefined physics interface is not available. The benefit or desirability of the described physics interfaces over the use of generic PDE modes (or PDE interfaces) for setting up multiphysics problems is that generic PDE modes (or PDE interfaces) require knowledge about the description of physical properties, physical quantities, and physical phenomena in terms of PDEs, whereas the predefined physics interfaces greatly simplify the process for describing the physical properties, physical quantities, and physical phenomena.

Earlier multiphysics modeling systems provided for the creation of applications based on a model formulation such as the waveguide elbow discussed in more detail in U.S. Pat. No. 7,596,474, which is incorporated herein by reference in its entirety. Physics interfaces (or application modes as discussed above) and physics interface settings for multiphysics modeling systems are directed to a specific physics phenomena. An application and application settings in a multiphysics modeling system may include accessing a limited set of parameters, variables, physical properties and physical quantities in a multiphysics model. Thus, in contrast to physics interface settings, the application settings may be tailored for a very specific use rather than a physics phenomenon. For example application settings may include settings for parameters that control a parameterized geometric representation of the multiphysics model.

U.S. Patent Publication No. 2014/0047407, published on Feb. 13, 2014, and International Publication No. WO 2014/100727 A1, published Jun. 26, 2014 describe an aspect of a system and method for creating an application data structure, based on a multiphysics model, from a dedicated graphical user interface in an application builder software for accessing features and feature settings for the multiphysics model. Such a graphical user interface gives access to methods for generating a data structure representing an application using the existing settings for the multiphysics model. The application data structure is then interpreted by another method to make it accessible from the graphical user interface in a multiphysics modeling software for generating an application model data structure and a multiphysics model data structure for simulations.

As discussed above and in more detail below, this disclosure refers to a number of components for modeling systems, including reference to different types of builders along with the data structures that the builders create.

In some aspects, the different components of a multiphysics modeling system can include a model builder, a physics builder, and an application builder. Typically, each of these builders includes graphical user interfaces for receiving model inputs from a system user. A model builder can include executable methods for creating multiphysics models, where the methods include, for example, receiving input(s) for physics properties as functions of physics quantities. The model builder then produces a set of coupled PDEs using two or more physics interfaces.

In some aspects, a physics builder can include executable methods for creating interfaces for the creation of multiphysics models. The physics builder can include methods for receiving inputs in the form of PDEs, coefficients of PDEs and interface components for settings of the PDEs and the PDE coefficients. The physics builder then creates physics interfaces that can be used in the model builder.

In some aspects, an application builder can include methods for creating application interfaces for running multiphysics models. The application builder can include methods for receiving inputs for defining interface components that can be used to modify and run embedded multiphysics models that are stored as multiphysics model data structures. The multiphysics models are embedded in an application data structure. In some aspects, the multiphysics models are initially created by the model builder from an application interface.

In some aspects, a multiphysics model data structure includes modeling components, such as but not limited to, modeling operations and commands for one or more physical systems. An application data structure includes an embedded multiphysics model data structure along with additional data representing user interface components, such as but not limited to, widgets, widget collections, forms, form collections, and window forms, that may be linked to the modeling operations and commands contained within the embedded multiphysics data structure. The application data structure can then be interpreted, creating an application model data structure. The application model data structure is an instantiation of an application data structure where the application interface may be accessible from various graphical user interfaces.

A desirable aspect of the application builder wizard is that it guides a system user in creating an application data structure that can be used for executing applications. Such an application can be based on an existing multiphysics model that is embedded in the application data structure. It may also be desirable to show such an application builder wizard when the user of a multiphysics modeling system saves a multiphysics model as an application. It would further be desirable to use the application data structure created by an application builder wizard in an application builder to modify an existing application data structure by adding forms, widgets, methods, and events.

In some non-limiting aspects of the systems herein, an application builder wizard includes instructions for guiding system users that includes providing or displaying one or more lists of user-selectable options. The listed options can be categorized, such as under various user selectable tabs (e.g., input/output; plots; graphics, buttons) that allow the desired modeling operations to be easy to find and to significantly simplify the modeling process, particularly for developing customized modeling applications. In some aspects, it is contemplated that listed user-selectable options (e.g., modeling operation) may be included in a second list of options or in a plurality of second lists of options that appear following the receipt of a selection from the first list of options. For example, widgets, widget collections, forms and form collections can be created for an application using the application builder wizard, based on the selections from the one or more user-selectable options including the second list(s) of options. Following the user selections, in some aspects, the application builder wizard automatically displays the created widgets, widget collection, forms, and/or form collections in a preview of a window displayed in graphical user interface, thereby allowing a system user to view the created item and speeding up the application building process. The widgets, widget collections, forms, and/or form collections can further be automatically linked to the selected modeling operations.

In another non-limiting aspect, a system for generating a modified application data structure for modeling physical systems is generated from guided user inputs received through an application builder wizard. The system guides the user by presenting to the user a GUI window displaying lists along with a preview in response to a user selection for creating a new application window form. For example, the user selection may occur by the selection of a "New Form" button display in the window. A first group of lists can comprise a list of items, representing modeling operations, available in an embedded multiphysics model. The first group of lists can include (i) a first list of input/output modeling operations, (ii) a second list of graphics modeling operations, and/or (iii) a third list including command sequences for modeling operations. The GUI window can also display a second group of lists including (a) a first list of selections, including selected input/output modeling operations, (b) a second list of selections, including selected graphics modeling operations, and/or (c) a third list of selections, including command modeling operations. In response to a user selecting one or more modeling operations from the first, second, or third lists of modeling operations, the selected modeling operations are added to the respective first, second, and/or third lists including the selected modeling operations. In response to a modeling operation being added to one of the lists of selected modeling operation, a widget, a widget collection, a form, and/or a form collection are linked to the modeling operation. A preview of the new application window form showing the created widgets, widget collections, forms, and/or form collections, arranged according to default settings, are displayed in a preview area of the GUI window.

An application builder wizard for generating application data structures and for modifying application data structures used in multiphysics modeling systems can be executed as part of an application builder or it may be a standalone system. The standalone system can interface or connect with an engineering analysis system, such as a multiphysics modeling system. It is also contemplated that the application builder wizard may be a one of or a part of a plurality of modules or components, that include instructions, which comprise an engineering analysis system. An application builder wizard component can include or be connected with a user interface, such as a graphical user interface, that seeks inputs and displays instructions to a system user. The application builder wizard can be executed on one or more modeling system processing units associated with various computer systems described elsewhere herein including, among other things, the computer and/or server systems and apparatus described for multiphysics modeling systems.

It is contemplated to be desirable for the application builder wizard to be available in, or accessible to, an engineering analysis system, such as a multiphysics modeling system which may generate a model, described in a model object (e.g., a model data structure including data fields and methods along with their interactions) in accordance with an object-orient programming language (e.g., C++, C#, Java®).

Systems for computer aided engineering, such as finite elements analysis systems, finite volume systems, computational fluid dynamics (CFD) systems, and multiphysics modeling systems are often equipped with a graphical user interface where a user may set up and run a simulation. Such processes or systems may contain a number of different user interfaces for different types of simulations, such as CFD, heat transfer, electromagnetics, or structural mechanics simulations.

Methods for setting up and solving multiphysics problems and other modeling systems are described in U.S. Pat. No. 8,219,373, issued Jul. 10, 2012; U.S. Pat. No. 7,623,991, issued Nov. 24, 2009; U.S. Pat. No. 7,519,518, issued Apr. 14, 2009; U.S. Pat. No. 7,596,474, issued Sep. 29, 2009; and U.S. Patent Application Publication No. 2012/0179426, published Jul. 12, 2012, each of which are hereby incorporated by reference herein in their entireties. These published patent documents describe, for example, methods for setting up and executing multiphysics simulations, including several coupled physical phenomena, by receiving inputs in the form of physical properties that may be expressed in terms of physical quantities. In addition, the above-referenced U.S. patents and patent application disclose methods for setting up problems using physical properties, physical quantities, and physical phenomena described using partial differential equations (PDEs). Some of the above-referenced published patent documents provide for methods and systems for setting up and solving multiphysics problems using predefined application modes that are otherwise referred to in the present disclosure, and in some of the other referenced patent documents, as physics interfaces. Components of the physics interfaces can include parameters, variables, physical properties, physical quantities, boundary and initial conditions, and solvers with settings and menus along with various other physics interface components, such as input fields for setting or defining parameters, variables, physical properties, physical quantities, boundary and initial conditions, and solvers. These settings and menus may be tailored for the specific physics instead of using the generic mathematical settings. In addition, these published patent disclosures also describe methods for PDE modes, also referred to as PDE interfaces, in the cases where predefined physics interfaces are not available. The use of the generic PDE modes and PDE interfaces for setting up multiphysics problems requires knowledge about the description of physical properties, physical quantities, and physical phenomena in terms of PDEs.

It is contemplated that systems and methods operable to or adapted to automate and simplify the generation of an application data structure and/or the modification of an application data structure, based on a multiphysics model, would be desirable and provide various computational advantages for engineering design systems, including modeling and simulation systems. The methods and systems for generating or modifying an application data structure can be implemented on dedicated graphical user interface(s) in an application builder wizard that is configured to or adapted to guide a user through the creation and/or modification of an application data structure.

Throughout this disclosure, various non-limiting exemplary aspects of systems are described that include methods, executed on one or more modeling system processing unit(s), which are accessible via a graphical user interface. The methods include instructions for guiding system users through the generating and/or modifying of application data structures for modeling physical systems. It is contemplated that the generated and/or modified application data structures can be applied or associated with an engineering analysis system (e.g., a multiphysics modeling system), where the data structure(s) may be built and applied by a system user.

Physical computing devices embodying engineering analysis, modeling, and/or simulation systems may be configured with one or more graphical user interfaces that allow a system user to input and execute simulations and build or modify application data structures. The computer systems can include different interfaces for different types of simulations. Different user interfaces may, for example, be provided for fluid flow, heat transfer, electromagnetic, and/or structural mechanics simulations.

A system having a dedicated graphical user interface for generating or modifying an application data structure and an application model data structure are contemplated in some aspects of the present disclosure. For example, a computer system may include a graphical user interface and provide windows with user-selectable options for defining the parameters, forms (e.g., application window form), features (e.g., form; widget), actions (e.g., command sequence), variables, physical properties, physical quantities, and/or physics interface features for a desired physics phenomena associated with a desired analysis or simulation. The graphical user interface can allow access to routines or methods that then generate or modify an application data structure. The generated or modified data structure(s) may then be interpreted or processed by a routine or method configured to create or modify the application model data structure and to make the application interface accessible from other graphical user interface(s) associated with, for example, an engineering analysis system such as a multiphysics modeling system. It is contemplated that the routines or methods for these operations can be executed locally on, and/or remotely through network connection(s) to, one or more modeling system processing unit(s), either dedicated or shared, executing the engineering analysis systems.

Computer systems may be used for performing the different tasks described in the present disclosure. One aspect for using a computer system includes executing one or more computer programs, including engineering analysis systems and methods, stored on computer readable media (e.g., temporary or fixed memory, magnetic storage, optical storage, electronic storage, flash memory, other storage media). A computer program may include instructions which, when executed by a modeling system processing unit, perform one or more tasks. In certain embodiments, a computer system executes machine instructions, as may be generated, for example, in connection with translation of source code to machine executable code, to perform modeling and simulation, and/or problem solving tasks. One technique, which may be used to model and simulate physical phenomena or physical processes, is to represent various physical properties and quantities, of the physical phenomena or physical processes being modeled and simulated, in terms of variables and equations or in other quantifiable forms that may be processed by a computer system. In turn, these equations or other quantifiable forms may be solved by a computer system configured to solve for one or more variables associated with the equation, or the computer may be configured to solve a problem using other received input parameters.

It is contemplated that computer programs for modeling and simulating physical phenomena or physical processes along with systems that provide for the building of applications interfaces for modeling systems, provide many advantages particularly as the complexity of the physical phenomena or physical processes being modeled and simulated increases. For example, in certain embodiments a user can combine one or more physical phenomena into a multiphysics model, as part of, for example, an engineering analysis. To further illustrate this example, a user may combine phenomena described by chemical kinetics and fluid mechanics, electromagnetic phenomena and heat transfer, structural mechanics and fluid flow, or other physics phenomena. Such multiphysics models may also involve multiple physical processes. For example, a process may be combined that includes an amplifier powering an actuator, where both the amplifier and the actuator are a part of one multiphysics model. Multiphysics modeling can also include solving coupled systems of partial differential equations (PDEs).

It is contemplated that computer systems on which modeling systems operate, such as the modeling systems described herein, can include networked computers or processors. In certain embodiments, modeling system processing units may be operating directly on the modeling system user's computer (e.g., a host or client), and in other embodiments, a modeling system processing unit may be operating remotely (e.g., a remote server system). For example, a user may provide various input parameters at one computer or terminal located at a certain location. Those parameters may be processed locally on the one computer or the parameters may be transferred over a local area network or a wide area network, to another processor, located elsewhere on the network that is configured to process the input parameters. The second processor may be associated with a server connected to the Internet (or other network) or the second processor can be several processors connected to the Internet (or other network), each handling select function(s) for developing and solving a problem on the modeling system. It is further contemplated that the results of the processing by the one or more processors can then be assembled at yet another server or processor. It is also contemplated that the results may be assembled back at the terminal or computer where the user is situated. The terminal or computer where the user is situated can then display the solution of the multiphysics modeling system to the user via a display (e.g., a transient display) or in hard copy form (e.g., via a printer). Alternatively or in addition, the solution may be stored in a memory associated with the terminal or computer, or the solution may be stored on another server that the user may access to obtain the solution from the modeling system.

It is contemplated that in certain embodiments a product or process may be in the development or feasibility stage where it is being designed or analyzed. The product or process being developed or analyzed may need to be assessed for use in complex environment(s) involving several physical properties and quantities. It can be desirable to solve complex multiphysics problems by systematically varying parametric and geometric features in a computer-based design system. Other desirable features may include, for example, having a computer-based system for solving complex multiphysics problems in which the settings for the physical properties and boundary conditions, located in a memory and used to form multiphysics models and/or solve multiphysics problems, can be accessed directly from the design system.

Figure 1B:
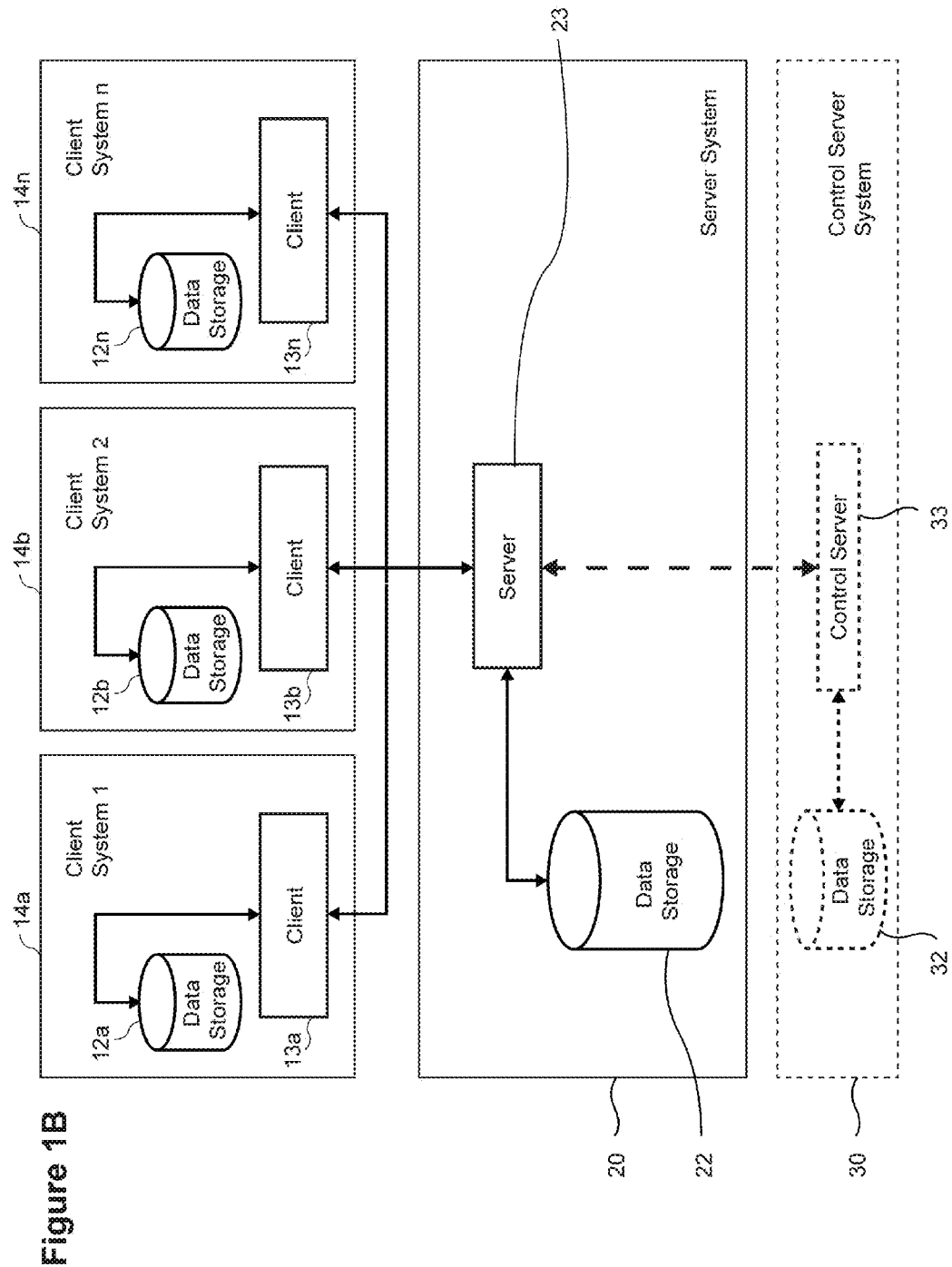
Figure 1C:
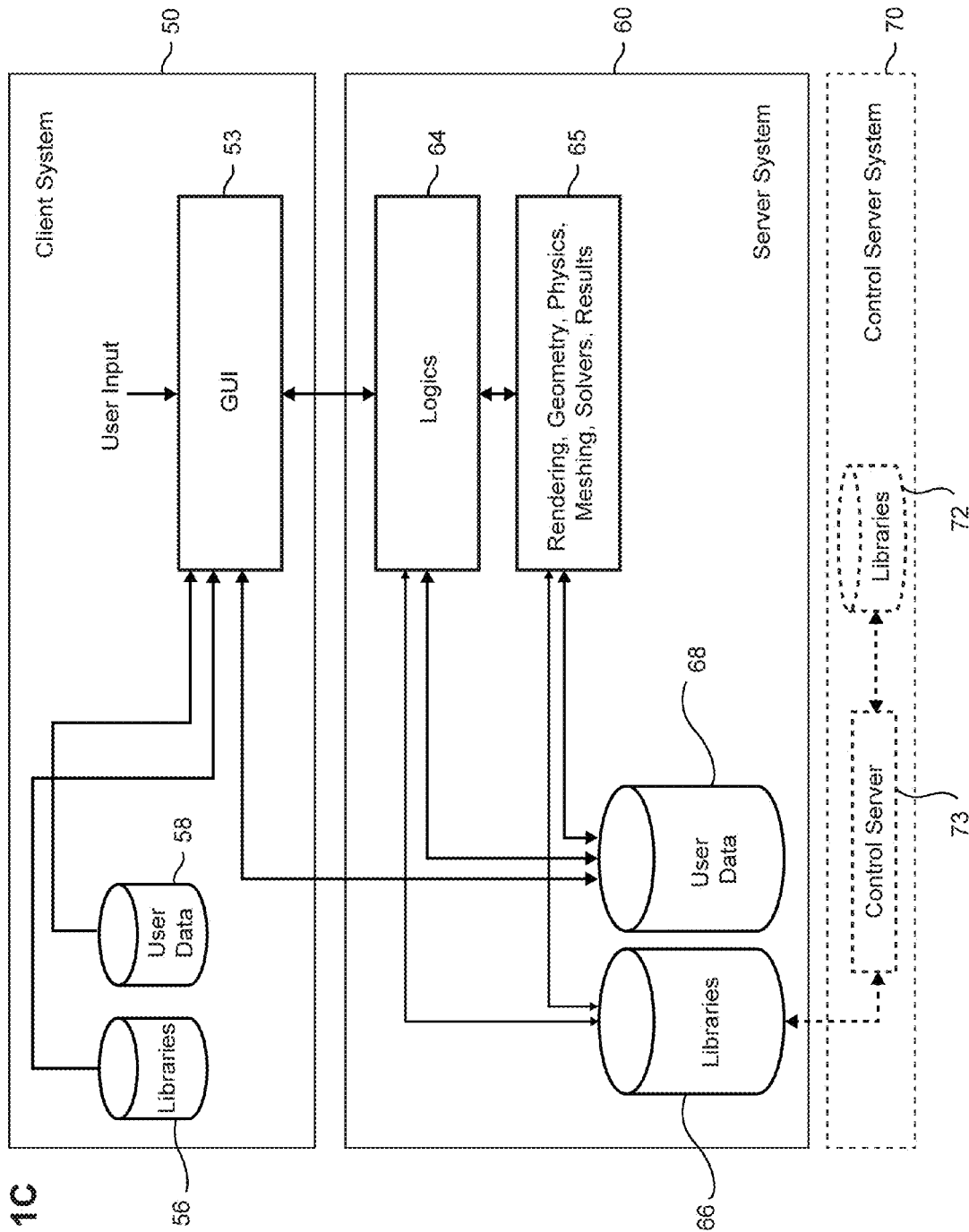

Referring now to FIGS. 1A-1C, exemplary aspects of computer and server systems are illustrated that may be used with the methods described herein including modeling systems and application builder wizard systems for generating or modifying application data structures.

FIG. 1A illustrates a computer system 110 that includes a data storage system 112 connected to host systems 114a-114n through communication medium 118. In some aspects, data storage systems may also be hosted locally on any one of the host systems 114a-114n. In computer system 110, the "n" hosts 114a-114n may access the data storage system 112, for example, in performing input/output (I/O) operations. The communication medium 118 for communicatively connecting the various system components may be any one of a variety of networks or other type of communication connections as known in the modeling and computer simulation field. For example, the communication medium 118 may be the Internet, an intranet, or other network connection by which the host systems 114a-114n may access and communicate with the data storage system 112, and may also communicate with others included in the computer system 110, including without limitation systems based on various forms of network communications (e.g., fiber optic, wireless, Ethernet).

Each of the host systems 114a-114n and the data storage system 112 included in the computer system 110 may be connected to the communication medium 118 by any one of a variety of connections as may be provided and supported in accordance with the type of communication medium 118. The processors included in the host computer systems 114a-114n or a data manager system may be any one of a variety of commercially available single or multi-processor system, such as an Intel-based processor, server, or other type of commercially available processor able to support incoming traffic in accordance with each particular embodiment and application.

It should be noted that the particulars of the hardware and systems included in each of the host systems 114a-114n, as well as those components that may be included in the data storage system 112 are described herein in more detail, and may vary with each particular embodiment. Each of the host computers 114a-114n, as well as the data storage system 112, may all be located at the same physical site, or, alternatively, may also be located in different physical locations. Examples of the communication medium that may be used to provide the different types of connections between the host computer systems, the data manager system, and the data storage system of the computer system 110 may use a variety of different communication protocols such as SCSI, ESCON, Fiber Channel, or functional equivalents that are known to those skilled in the computer modeling and simulation field. Some or all of the connections by which the hosts and data storage system 112 may be connected to the communication medium 118 may pass through other communication devices, such as a Connectrix or other switching equipment that may exist, both physical and virtual, such as a phone line, a repeater, a multiplexer or even a satellite.

Each of the host computer systems may perform different types of data operations, such as storing and retrieving data files used in connection with an application executing on one or more of the host computer systems. For example, a computer program may be executing on the host computer 114a and store and retrieve data from the data storage system 112. The data storage system 112 may include any number of a variety of different data storage devices, such as disks, tapes, and the like in accordance with each implementation. As will be described in following paragraphs, methods may reside and be executing on any one of the host computer systems 114a-114n. Data may be stored locally on the host system executing the methods, as well as remotely in the data storage system 112 or on another host computer system. Similarly, depending on the configuration of each computer system 110, methods as described herein may be stored and executed on one of the host computer systems and accessed remotely by a user on another computer system using local data. A variety of different system configurations and variations are possible then as will be described in connection with the embodiment of the computer system 110 of FIG. 1 and should not be construed as a limitation of the techniques described elsewhere herein.

Turning now to FIG. 1B, another non-limiting exemplary aspect of a system adapted to generate a modified application data structure is described. The system can include one or more client processing systems 14a, 14b . . . 14n. In some aspects, the client processing systems 14a-n include components corresponding to a modeling and simulation system, such as components (when executed on a processor present in client computer(s) 13a, 13b . . . 13n) to display a graphical user interface, receive user input, and display outputs of the modeling and simulation system that are results of the user input. The client processing system(s) 14a-n can further include software components that generate input commands, send user input data, and send generated input commands to a server system 20 communicatively connected to the client processing system(s). The server system 20 includes a server processing unit 23. The client processing system(s) 14a-n can also receive output data and output commands from the server system where the output data and output commands correspond to the user input previously sent to the server system 20. The client processing system(s) 14*a-n* and the server system 20 can each include their own data storage components 12*a*, 12*b* . . . 12*n*, 22. It is further contemplated that client processing system(s) can further include components, that upon execution, implement output commands and display output data in a graphical user interface.

The server system 20 can include components, that upon execution, receive input data and input commands from communicatively connected client processing system(s) 14*a*, 14*b* . . . 14*n*. In some aspects, the server system 20 can further include executable components for sending input data to and receiving data from a control server computer 30 that includes a control server processor 33 and may also have data storage components 32. The control server computer can be used to control access to certain operations of a modeling system. The server system 20 can also include executable components for generating output data and output commands based on the received input data, input commands, and/or control data; and send these output data and output commands to any one of the client processing system(s) 14*a-n*. In some aspects, the server system 20 may further include executable components to verify if an input command may be executed, as determined by the received control data.

Modeling processing units, display devices, and/or memory device are contemplated to be a part of the client processing systems 14*a-n*, server system 20, and/or control server system 30.

Turning now to FIG. 1C, a further non-limiting exemplary aspect of a system adapted to generate a modified application data structure is described. The system can include a client processing system 50 that includes executable components for a graphical user interface 53, where user input may be received and output may be displayed. The client processing system can store user data generated through user input and output received from a server system 60. The client processing system may also locally store executable software component libraries which are used to display graphical user interface(s), receive input, generate input commands, execute output commands, and display output. User data can be stored on client user data storage component 58 or on a server system user data storage component 68. Similarly library data can be stored locally on a client library storage component 56.

In one illustrative aspect, user input may be received via the GUI 53 of the client processing system 50 based on a user selecting an option via the GUI 53 to create an exemplary geometry, such as a cylinder geometry. The input and input commands may be sent to the communicatively connected server system 60. Output data and output commands received from the server system can then be executed on the client processing system 50 to render and display the exemplary cylinder geometry and to refresh the graphical user interface 53, based on the exemplary user input for a cylinder. Thus, the server system 60 can receive user input data and input commands from a client processing system 50 and use the received data and commands to generate output data and output commands that can be received by the client processing system 50. These output data and output commands determine what will be shown in the graphical user interface 53 in the client processing system 50 and are based on the user input.

The server system can include executable components that determine logics associated with a modeling system. For example, upon execution of logics component 64, which is similar to an application program interface component, the logics component 64 can receive input data and input commands from the client processing system 50 and determine how to process received input. The logics component 64 can determine which modeling and simulation software components should be used to process input data and execute input commands, and which components should be used to generate output data and output commands, based on the user input. The input data and input commands may be relayed by the logics component(s) 64, upon execution, to one or more of rendering, geometry, physics, meshing, assembling, solver, and results components, collectively referred to in FIG. 1C as component 65. The output data and the output commands from component 65 can then be relayed to the client processing system 50 by the logics components 64.

The server system 50 may store and access logics component libraries 66. The server system 50 may also store user data 68 used by the logics components 64. As discuss above, the server system 50 may also include aspects for rendering the graphical user interface in component 65, that builds the geometry, defines the physics, generates the mesh, assembles the numerical model, solves the numerical model, and generates the output data and output commands, in an application builder or multiphysics modeling software. Continuing on the illustrative example of the cylinder, a logics component 64 can receive user input in the form of input data and input commands for generating a cylinder and send these data and commands to a geometry component that is part of component 65. The geometry component executes the cylinder command and sends an output to the rendering component that is also a part of component 65. The logics component 64 may then receive the output from the rendering component and send rendering data, for the cylinder geometry together with its settings, to the client processing system 50 for display in the graphical user interface 53.

The server system 60 may also store and access library components 66 for rendering, building the geometry, generating the mesh, assembling the numerical model, solving the numerical model equations, and generating the results.

In some aspects, the graphical user interface 53 and the logics components 64 may send data and commands that may be trigger a control check in the rendering, geometry, physics, meshing, assembling, solvers, and results components of component 65, which then may generate a request that is sent to a control server 70. The server system 60 may then receive data from control server system 70 that is used to determine if it should allow the execution of commands. The data sent to the server system 60 from the control server system 70 is generated by the control server 73 using a file that may be stored, for example in the libraries component 72, of the control server system 70.

Modeling processing units, display devices, and/or memory device are contemplated to be a part of the client processing system 50, server system 60, and/or control server system 70.

Figure 2:
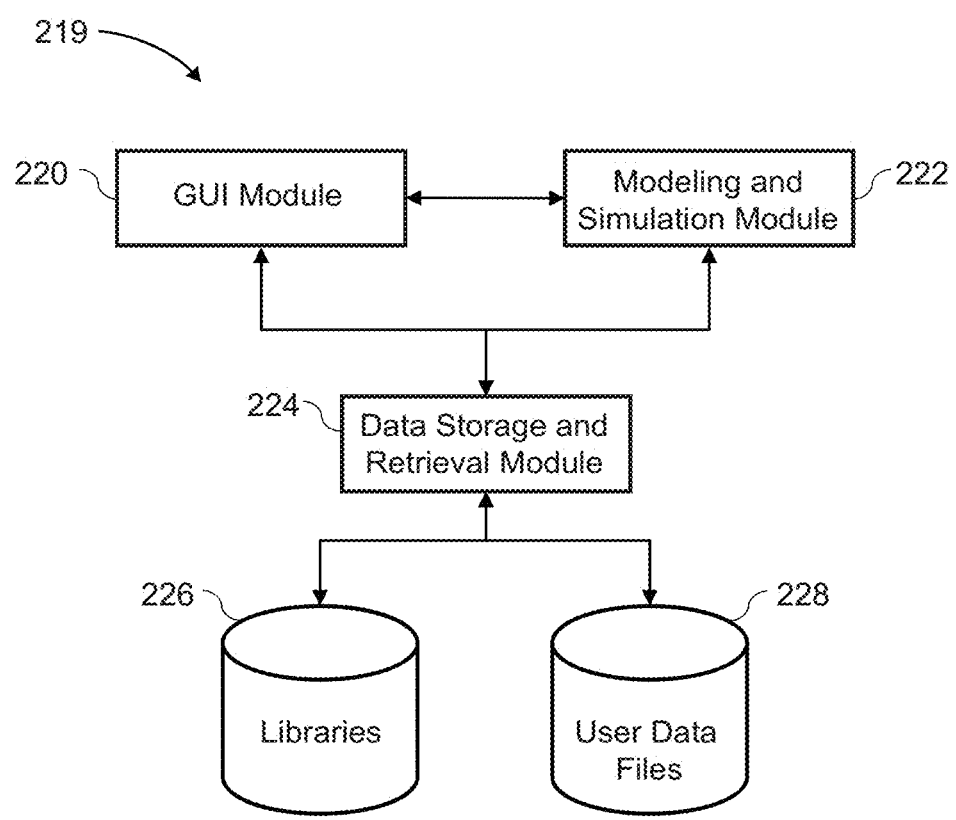
FIG. 2 illustrates an exemplary aspect of computer systems that may reside and be executed in one of the hosts of FIG. 1A according to aspects of the present disclosure.

Referring now to FIG. 2, an exemplary aspect of a modeling system 219 is illustrated that may reside, for example, on a single computer or in one of a plurality of host computer systems (such as host computers 114*a*-114*n* illustrated in FIG. 1A). The modeling system may be divided into several components. One exemplary aspect of the system may include a GUI module 220, a Modeling and Simulation module 222, and a Data Storage and Retrieval module 224. The GUI module 220 can provide for interactions with system users. The Modeling and Simulation module 222 can provide an ability to manage and perform a multiphysics simulation. The Data Storage and Retrieval module 224 can provide an ability to load and save the model in a file, and to load and store other types of files which may be used during the simulation or may be used as input or output to the simulation.

The GUI module 220 may communicate with the Modeling and Simulation module 222 by sending and receiving commands. As may also occur on the other computer and server systems described herein, the act of sending and receiving commands may be performed through an application programming interface ("API") or other similar components. In one aspect of the system, the API may be object oriented, and mix data and function calls within the same structure. In another aspect of the system, the API may use a data structure that is separate from function calls.

It is contemplated that the GUI module 220 can include a plurality of modeling system, such as a multiphysics model builder interface, an application builder interface, a form editor interface, and/or an application builder wizard interface for creating application data structures. The application builder wizard interface may operate in the GUI module and may also interface with other modules such as the Modeling and Simulation Module 222 and/or the Data Storage and Retrieval Module 224.

It is contemplated that in certain aspects of the present disclosure components of the multiphysics modeling system may reside on different host computer systems. For example, the GUI module 220 may reside on a personal computer host and the Modeling and Simulation module 222 may reside on a server computer host. It is further contemplated that the Data Storage and Retrieval module 224 may reside on either the personal computer host or the server computer host, or yet another separate computer host. If the computer hosts are not identical, the API can be configured to use a computer network to communicate between hosts. In one embodiment, an object-oriented API may be configured to send data and method calls over the computer network or in another embodiment send data and function calls between the components over a computer network. The API may also be able to handle a Data Storage and Retrieval module 224 which may be located either on the host of the GUI module 220 or the Modeling and Simulation module 222, or on a separate host. In each of those cases, the Data Storage and Retrieval module 224 may be configured to load and store files on each of those hosts.

It is contemplated that in certain aspects, the system 219 may include, or be configured with, operating systems such as Windows 8, Mac OS, iOS, Android, Chrome OS, and the like, or system components other than what is described and represented in the modeling system 219 illustrated in FIG. 2. In the exemplary aspect illustrated in FIG. 2, Libraries 226 and the User Data Files 228 can be stored locally within the host computer system. It is further contemplated that in certain aspects, the Libraries 226 and/or User Data Files 228, as well as copies of these, may be stored in another host computer system and/or in the Data Storage System 112 of the computer system 110. However, for simplicity and explanation in paragraphs that follow, it may be assumed in a non-limiting manner that the system 219 may reside on a single host computer system such as 114a with additional backups, for example, of the User Data Files and Libraries, in the Data Storage System 112.

In certain aspects of the present disclosure, portions of the modeling system 219, such as the GUI module 220, the Modeling and Simulation module 222, the Data Storage and Retrieval module 224, and/or the Libraries 226 may be included or executed in combination with commercially available system package(s). These components may operate on one of the host systems 114a-114n, and may include one or more operating systems, such as, Windows XP®, Windows 7, Windows 8, Windows HPC Server 2008 R2, Unix®, Linux®, Mac OS®, iOS, Chrome® OS, Android®, and the like. It is further contemplated that the modules of the modeling system 219 may written in any one of a variety of computer programming languages, such as, C, C++, C#, Java®, or any combination(s) thereof, or other commercially available programming languages.

It is contemplated that the GUI module 220 may display GUI windows in connection with obtaining data for use in performing modeling, simulation, and/or other problem solving for one or more processes and/or physics phenomena under consideration by a system user. The one or more processes and/or phenomena may be assembled and solved by the Modeling and Simulation module 222. That is, user data may be gathered or received by the system using modules, such as the GUI module 220, and subsequently used by the Modeling and Simulation module 222. Thereafter, the data may be transferred or forwarded to the Data Storage and Retrieval module 224 where the user-entered data may be stored in a separate data structure (e.g., User Data Files 228). It is contemplated that other data and information may also be stored and retrieved from a separate data structure, such as Libraries 226, which may be used by the Modeling and Simulation module 222 or in connection with the GUI module 220.

The various data files that may be associated with a modeling system, such as User Data Files 228 and the Libraries 226, may be stored in any one of a variety of data file formats in connection with a file system used in the host computer system or in the Data Storage System 112. In certain aspects, the system 219 may use any one of a variety of database packages in connection with the storage and retrieval of data. The User Data files 228 may also be used in connection with other simulation and modeling systems. For example, the User Data files 228 may be stored in a format that may also be used directly or indirectly as an input to any one of a variety of other modeling systems. In certain aspects, data may be imported and/or exported between the multiphysics modeling system and another system. The format of the data may be varied or customized in accordance with each of the system(s) as well as in accordance with additional functionalities that each of the system(s) may include.

It is contemplated that the systems and methods described herein may be used for combining a plurality of physics interfaces to create a multiphysics model for modeling different physical phenomena or processes. Properties of the physics interfaces can be represented by PDEs that may be automatically combined to form PDEs describing physical quantities in a coupled system or representation. It is contemplated that the PDEs may be provided to the solver either independently as one PDE or a system of PDEs, describing a single phenomenon or process, or as one or several systems of PDEs describing several phenomena or processes.

It is contemplated that in certain aspects of the present disclosure physical properties can be used to model physical quantities for component(s) and/or process(es) being examined using the modeling system, and the physical properties can be defined using a GUI that allow the physical properties to be described as numerical values. In certain aspects, physical properties can also be defined as mathematical expressions that include one or more numerical values, space coordinates, time coordinates, and/or the actual physical quantities. In certain aspects, the physical properties may apply to some parts of a geometrical domain, and the physical quantity itself may be undefined in the other parts of the geometrical domain. A geometrical domain or "domain" may be partitioned into disjoint subdomains. The mathematical union of these subdomains forms the geometrical domain or "domain". The complete boundary of a domain may also be divided into sections referred to as "boundaries". Adjacent subdomains may have common boundaries referred to as "borders". The complete boundary is the mathematical union of all the boundaries including, for example, subdomain borders. For example, in certain aspects, a geometrical domain may be one-dimensional, two-dimensional, or three-dimensional in a GUI. However, as described in more detail elsewhere herein, the solvers may be able to handle any space dimension. It is contemplated that through the use of GUIs in one implementation, physical properties on a boundary of a domain may be specified and used to derive the boundary conditions of the PDEs.

Additional features of a modeling system, such as feature that may be found in the Modeling and Simulation module 222, may provide for automatically deriving a system of PDE's and boundary conditions for a multiphysics model. This technique can include merging the PDEs of the plurality of phenomena or processes, and may produce a single system of coupled PDEs, also using coupling variables or operators to couple processes in different coordinate systems, and may perform symbolic differentiation of the system of PDEs with respect to all the dependent variables for later use by the solver.

It is contemplated that certain aspects of the present disclosure may include features for modeling one or more of a plurality of engineering and scientific disciplines, including, for example, acoustics, chemical reactions, diffusion, electromagnetism, fluid mechanics, geophysics, heat transfer, optics, plasma physics, quantum mechanics, semiconductor physics, structural mechanics, wave propagation, and the like. Certain aspects of a modeling system may involve more than one of the foregoing disciplines and can also include representing or modeling a combination of the foregoing disciplines. Furthermore, the techniques that are described herein may be used in connection with one or more systems of PDEs.

Referring now to FIGS. 3 to 8, exemplary aspects of an application builder wizard are described. The application builder wizard is a system that creates or modifies an initial application data structure that is stored in one or more memory devices associated with a multiphysics modeling system. The generated application data structure, when executed on physical processing unit(s) of a multiphysics modeling system, provides a customized modeling of physical system(s). Each model of a physical system represents physical phenomena and/or physical processes. A multiphysics model data structure including data representing at least one modeling operation for determining how to model or simulate the one or more models of physical systems is embedded in the initial application data structure.

Modeling operations that are contemplated, and that the data in a multiphysics model data structure may represent, include such operations as defining model parameters, functions, variables, variable expressions, operators, physical properties, physical quantities, and/or material properties for modeling the physical system(s). Additional modeling operation can include importing, building, and/or displaying a model geometry and/or mesh. Modeling operations can also include setting and/or displaying (a) domain physics settings and physics properties, (b) boundary conditions, (c) constraints, (d) loads, (e) setting initial values, and/or (f) setting initial conditions for modeling the physical system(s). Further aspects of modeling operations that are contemplated include computing numerical equations for the model of physical system or the exporting of data, results, result plots, geometry, mesh, images, animations, and reports for the modeling of the physical system(s). Additional modeling operations can also include displaying and evaluating results, result plots, and/or reports along with the clearing (e.g., removal) of solutions and meshes for the model of physical systems.

Figure 3:
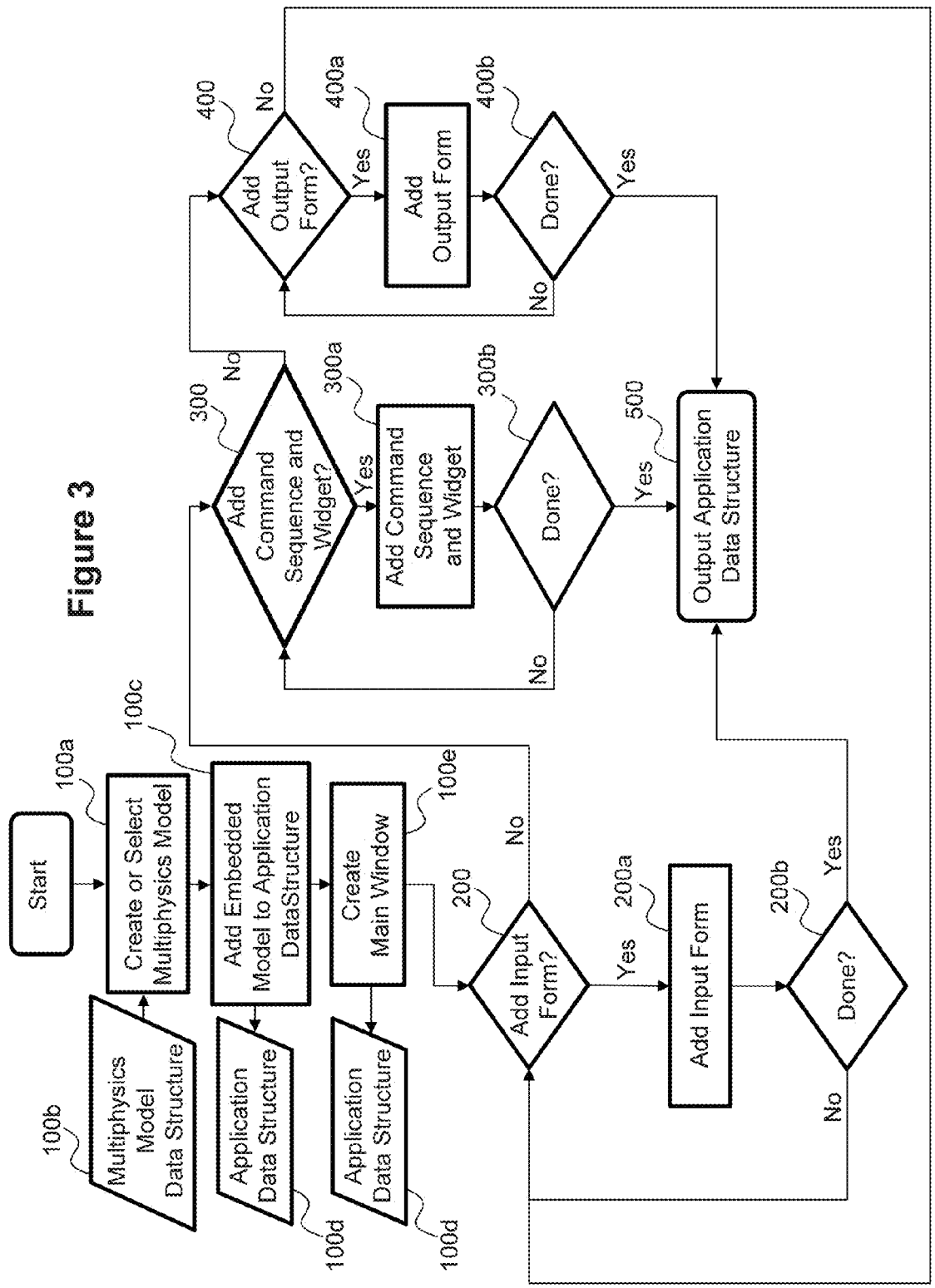
FIG. 3 illustrates a flowchart for exemplary aspects of a method for creating user interfaces for guiding the creation and modification of an application data structure according to aspects of the present disclosure.

The customized modeling created by the application builder wizard is in response to customized user inputs received via one or more new application window form(s) and one or more application features for the one or more new application window form(s). FIG. 3 illustrates exemplary aspects of a method for generating a modified application data structure. FIGS. 4-8 illustrate exemplary graphical user interfaces for exemplary aspects of the method steps of FIG. 3, including (i) the creation of an initial application data structure, (ii) adding a new form to an application data structure, (iii) adding a button widget to a new form and linking the widget to a command sequence in an embedded model of a physical system, (iv) selecting a window layout and for adding additional new forms in an application data structure, and (v) adding an output form to an application data structure.

In some aspects, an application builder wizard for creating an application data structure includes any of a plurality of application features. The application builder wizard can include a plurality of different user-selectable forms as will be described in more detail below. For example, the application builder wizard can include an input form that may have one or more selectable child nodes associated with an application feature, and thus, in some aspects the application builder wizard is a system that provides user-selectable options from a plurality of ready-made templates associated with application features for modeling physical systems. The application builder wizard described in the context of, for example, FIGS. 3 to 19, is particularly useful and desirable because it provides a system that allows for the quick and efficient building and customizing an application data structure that can then be executed by a multiphysics modeling system.

In some aspects, a method for accessing settings for forming an application data structure in an application builder's graphical user interface is implemented using an application builder wizard that guides the user of an application builder software. The method may add user inputs, methods to run operations and simulation using the embedded multiphysics model, and outputs such as graphs, tables, and values based on the operations and multiphysics modeling simulation.

In some aspects, a method interprets an application data structure and creates an application model in its own user interface or is embedded in a multiphysics software's user interface. The application running in its own user interface may access methods in a multiphysics modeling software, for example using a client-server connection. The method may load the application model data structure and process the execution sequence determined by this structure. The application model may be processed in a multiphysics modeling software to generate a multiphysics model data structure that can be used for running simulations.

Referring now to FIG. 3, a flowchart illustrates exemplary aspects of a method for creating or generating a modified application data structure. Select acts implemented as part of the method may be available through a graphical user interface in an application interface builder system, such as a modified version of the systems described in U.S. Patent Publication No. 2014/0047407, published on Feb. 13, 2014, entitled, "Systems and Methods for Creating Application Interfaces for Forming and Solving Problems in a Modeling System", which is incorporated by reference herein in its entirety, or the Application Builder available from COMSOL in the COMSOL Multiphysics® Version 4.4 product along with later versions. When the method illustrated by FIG. 3 is executed, the resulting application data structure can be particularly useful when applied to generate a customized application (e.g., a customized application that models and simulates a physical system) that accesses methods of a multiphysics modeling system, such as the methods from COMSOL Multiphysics® Version 4.4 (along with later and earlier versions), available from COMSOL, Inc. of Burlington, Mass., USA, and the multiphysics modeling systems described in U.S. Pat. No. 7,596,474, issued Sep. 29, 2009, and U.S. Pat. No. 8,626,475, issued Jan. 7, 2014.

The exemplary method of FIG. 3 may be useful for different applications of modeling and simulation of physical systems, such as the modeling and simulation of specific types of physical systems including an electric motor, a fuel cell stack, a loudspeaker, a waveguide, a mixer for fine chemicals and food industries, a multi-tube heat exchanger, a plasma reactor, a semiconductor wafer, and/or a pressurized pipe system, which are just a few of many examples to which the processes and systems disclosed herein can be applied to provide useful results. The generated customized application data structure created from the execution of the method of FIG. 3 accesses methods in the multiphysics modeling system for controlling selected settings in a multiphysics model and for running simulations within the multiphysics modeling system.

Beginning at step 100a, a multiphysics model can be either created or selected with the corresponding multiphysics model data structure 100b being loaded into a memory associated with the model processing unit(s) of the system executing the application builder wizard. Next, at step 100c, in some aspects of the application builder wizard, the multiphysics model data structure is embedded as an embedded model in an initial application data structure 100d. Then, at step 100e, a main window containing a single window form (or a plurality of window forms in some aspects) is automatically added as window form data to the application data structure, where other forms and widgets may be included using an application interface builder module. In some aspects, it is contemplated that the embedded multiphysics model data structure includes a geometry subroutine and a call to a geometry subroutine in a geometry sequence.

The acts at steps 100a-100e can be implemented by saving a multiphysics model onto a memory device as an application file and results in the creation of an initial application data structure with a corresponding embedded model and main window. It is also contemplated that an application interface builder system can include an option to select a new application and provide a list of multiphysics models that can be saved as applications.

Next, at steps 200 and 200a, the application builder wizard system of the present disclosure, through a graphical user interface, guides a user through the process of adding application features, such as one or more forms to the main window and to the application data structure. For example, a user may be prompted to add an input form (or form features) to the main window. Different forms can be created and can include an input field widget, which may be automatically linked to a parameter in the embedded model. Values of such parameter may be entered in the corresponding text box when the application is executed. The input field widget may also be associated with a label and a unit label that describe the expected input and its unit when the application is executed. Such labels can also be automatically linked to a description and the unit that are included in a parameter list in the embedded model.

An input form can include a widget or a collection of widgets that listen to or monitor for different user actions when an application is executed. An application interface builder module can include predefined template forms (or form features), form collections (or form collection features), and widget collections to be used in, for example, application windows whose layout and functionality are being determined for a customized application. It is also contemplated that an input form (or input widget) that can be added in step 200 and 200a can include a combo box for displaying a list of choices to a user that correspond to values of some string data, such as a string data field. It is contemplated that the settings of, for example, the string data field may be similar to those of the input field widget. A check box widget can also be added to allow a user to select between two alternatives, for example on or off, upon the execution of the application that is generated. It is also contemplated that a button widget can be an added input form and that the button widget may be used in a widget collection to perform an action when selected during the execution of an application. It is further contemplated that any of the above mentioned input widgets and forms can be associated and linked to other forms, widgets, events, and/or data.

After an input form is added at step 200a, a user can select to finish modifications to the customized application data structure at which point the process proceeds to step 500 where the application data structure is outputted and may be stored in a memory device for subsequent execution. The user can also opt to add additional input forms by returning to step 200 or to proceed to add command sequences and widgets at step 300.

At steps 300 and 300a, a command sequence (or action) together with a widget linked to the command sequence can be added to a newly created input form and to the application data structure (300 and 300a). The widget, for example a button widget, may be used to execute the command sequence when the application is executed. The application builder wizard system may guide the user of the application interface builder to add a button widget by, for example, displaying a list including command modeling operations available in the embedded multiphysics model. In some aspects, selected command may be displayed in a second list, and a preview of a button widget, linked to the selected command modeling operations, may be displayed to the user. In some aspects, the preview of the button widget is displayed with other created widgets. In some aspects, the button widget can be linked to a command sequence that executes a study and updates the results in the embedded model when the application is executed. A command sequence (or action) can also include an update of an output form, for example an update of a plot in the embedded model, which may refresh a plot in a graphics window in an application when a study is implemented as part of the execution of the application.

Modeling operations in the embedded multiphysics model data structure (e.g., step 100c) can be linked to a widget, widget collections, form features, or form collection features described herein. For example, a widget linked to a command sequence can implement modeling operations, such as defining model parameters, functions, variables, variable expressions, operators, physical properties, physical quantities, and/or material properties for a customized modeling of physical system(s). A widget can also be linked to a command sequence for importing, building, and/or displaying a model geometry and/or mesh. Other command sequences linked to a widget for modeling operations can also include setting and/or displaying domain physics settings and physics properties, boundary conditions, constraints, loads, setting initial values, and/or setting or defining initial conditions for a customized modeling of the physical system(s). Further aspects of modeling operations for which a command sequence can be linked to a widget include computing numerical equations for the model of physical system or the exporting of data, results, result plots, geometry, mesh, images, animations, and/or reports for a customized modeling of the physical system(s). Additional aspects of modeling operation for which a command sequence can be linked to a widget include displaying and evaluating results, result plots, and/or reports along with the clearing (e.g., removal) of solutions and meshes for the model of physical systems. The application builder wizard graphical user interface(s) are applied to receive the user inputs for the desired linking of added widget(s) to command sequence(s) for the desired modeling operation(s).

It is contemplated that a command sequence can also be selected, together with a widget or an input form, from a list of selectable command options (e.g., various modeling operations) in the embedded model and in the application data structure. The command options that are selected can then form a command sequence, which may then be linked to the selected widget or input form. The widget that executes a command sequence can be placed in an existing form, for example in an input form created previously, or in a newly created input form.

After a command sequence and widget is added at step 300a, a user can select to finish modifications to the customized application data structure at which point the process proceeds to step 500 where the application data structure is outputted and may be stored in a memory device for subsequent execution. The user can also opt to add additional command sequences and widgets by returning to step 300 or to proceed to add output form(s) at step 400.

At steps 400 and 400a, an output form can be added to modify an application data structure using an application builder wizard system. In some aspects, an output form can include an output widget, which may be a graphics widget that is linked to a plot group, a geometry, or a mesh in the embedded model. It is contemplated that several types of output forms and widgets may be defined in an application interface builder module. For example, an output form can include any widget that displays data from an output declaration or an object in the embedded model and in the application data structure that presents data. A data display output form may specify a display for output declarations. A data display output form may also be linked to an evaluation of a value in the embedded model. A table data display output form may be used as a convenient way of presenting a large number of output data from output declarations, for example it may be possible to use one output reference per column of the table. An export output form may open an export dialog to store the results to a memory device during the execution of the application. An export output form may also refer to export objects in the embedded model, for example animations, images, and data. It is also contemplated that an output form may be linked and automatically updated by a method, for example a command sequence, when the application is run.

As illustrated in FIG. 3 and described herein, steps 200, 300, and 400 may be repeated in order to add several application features, such as input forms, command sequences, and output forms, in creating or modifying an application data structure. In some aspects, each of the method steps described above may be followed by an option for closing the application builder wizard by selecting "done" in each of the options 200b, 300b, and 400b. Receiving a in some aspects, selection of "done" through the graphical user interface of the application builder wizard system proceeds to generate or modify an application data structure (500) as an output from the application builder wizard system. Each of the method steps 200, 300, and 400 may be carried out in an arbitrary order by the user of an application builder wizard system. New forms created in the method steps described above (e.g., 200, 300, and 400) do not have to be "pure" input or output forms. A new form can include a collection of forms (e.g., a form collection), such as input form(s), output form(s), and/or widgets, which would be considered member forms to the form collection. A "pure" form is just one type of form, such as just an input form or just an output form. For example, referring to FIG. 21, a form collection created by an application builder wizard is illustrated as element 1410 or the "Single Window Form", and include member forms such as input form 1430 and the "Compute" widget. The "Results" form would be considered a pure form.

In some aspects, it is contemplated that an application data structure generated by the application builder wizard system may be used directly for running an application; either in its own application user interface or as an application embedded in a multiphysics software. In addition, this application data structure may be extended in the main user interface (outside of the application builder wizard) in an application interface builder system in order to include new forms, widgets, events, declarations, and methods.

Figure 4:
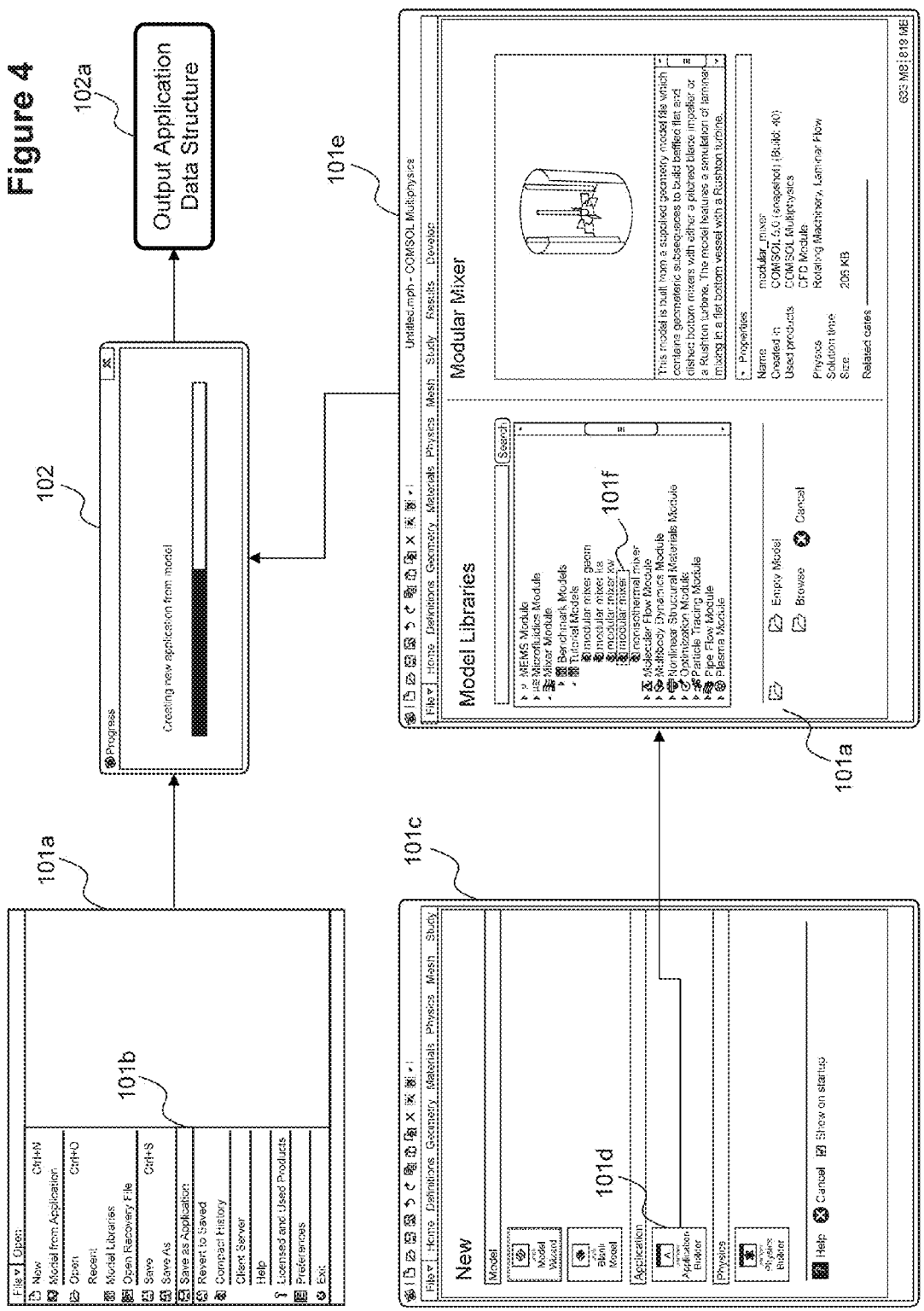
FIG. 4 illustrates an exemplary aspect of graphical user interfaces for a method step of creating an initial application data structure including adding a new window form, according to aspects of the present disclosure.

Referring now to FIG. 4, an exemplary aspect of graphical user interfaces are illustrated for a method step of creating an initial application data structure. FIG. 4 includes examples from a modeling system of a file menu 101a, a dialog page 101c for creating a new application, and a list 101e of multiphysics models where a user of a multiphysics modeling system may store a multiphysics model as an application. The display of the illustrated exemplary user interfaces and the selections therefrom are contemplated to be steps for creating an initial application data structure, the execution of which is illustrated in step 102 that results in the output of an application data structure 102a. The user interface and steps illustrated in FIG. 4 represent one or more of the steps 100a-100e from FIG. 3.

In some aspects, a user of a multiphysics modeling system may select the menu item "save as application" 101b, which may display the progress window 102 for the creating and outputting the initial application data structure 102a from an already open multiphysics model.

It is also contemplated that a user of an application interface builder system may create a new application by selecting the Application Builder indicia 101d, which can cause the display of a list of multiphysics models which may be divided into various model libraries of selectable models, such as a mixer model library, a MEMS model library, microfluidics module library, a pipe flow model library, or other model libraries. Such models may be selected 101f and saved as applications, which is followed by the display of the progress window 102 for creating and outputting an initial application data structure 102a.

As mentioned previously, the initial application data structure created in 102 may also include a main window with a window form for adding forms (and/or form features) and widgets to the application data structure for creating an application in an application interface builder system. Upon completion of the methods illustrated in FIG. 4, an application builder wizard is be executed in some aspects to guide the user of an application interface builder system through the method steps for adding application features, such as forms (and/or form features), widgets, events, declarations, methods, and other components to an initial application data structure to generate a modified application data structure. The user can be guided through the steps described in FIG. 3 along with the exemplary aspects illustrated herein, for example, beginning with FIG. 5.

Figure 5:
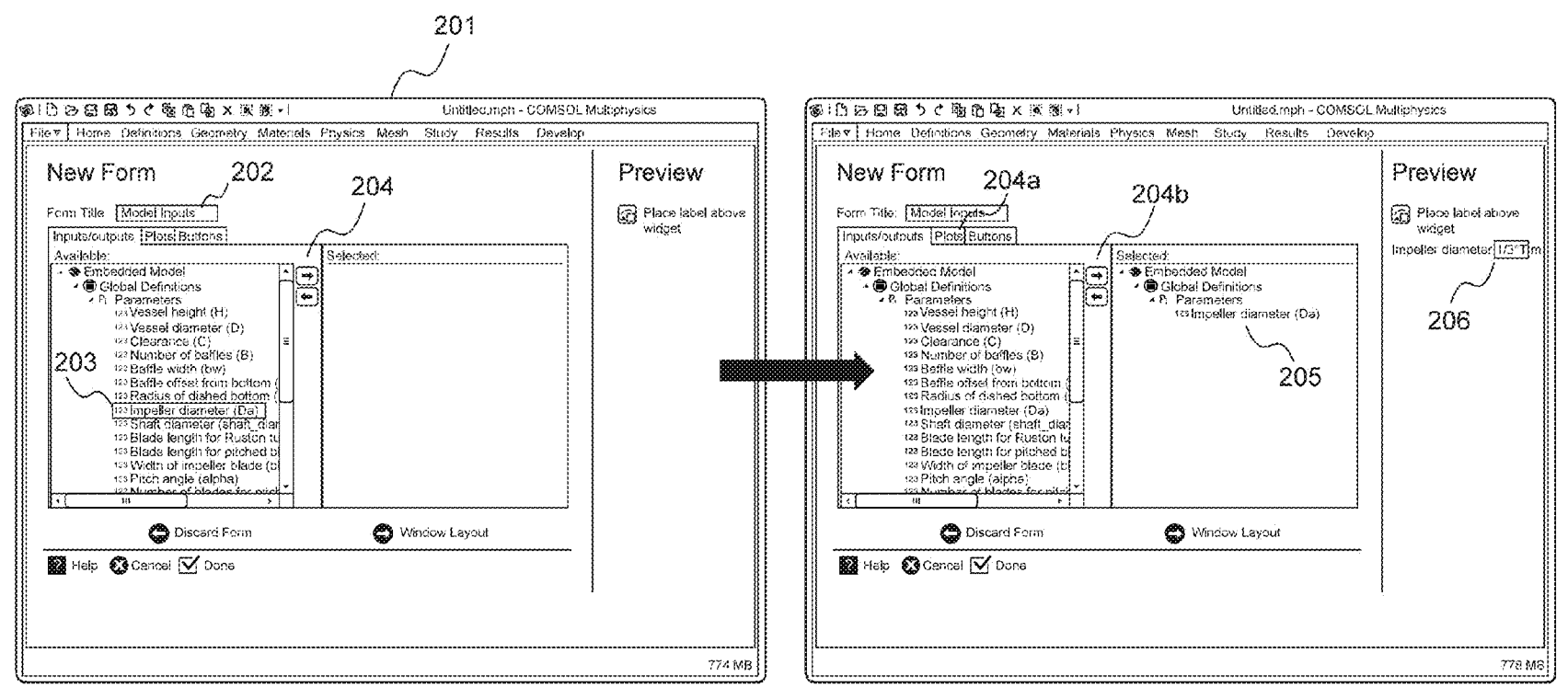

Referring now to FIG. 5, a graphical user interface for an application builder wizard window 201 is illustrated for one exemplary addition of an application feature, such as adding a new form to an application data structure. The GUI provides an exemplary aspect of an input form (see, e.g., elements 200 and 200a in FIG. 3) that can be created by the process of generating of an application data structure that is described in more detail in FIG. 3. The input form can include an input field widget that is linked to a parameter, such as in an embedded multiphysics model data structure for the mixer model selected previously in FIG. 4. The title of the input form may be entered in a form title text box 202. A parameter, for example the impeller diameter (e.g., 203), may be selected from a list of available inputs and outputs. The list of inputs and outputs is available in the embedded multiphysics model and, in some aspects, may be represented by the embedded model's model tree. Following a user selection 204 of a parameter, the new form page may be updated with the selected parameter 205 from the list of selected inputs (or outputs), and a preview of the input field widget and its associated label and unit label (e.g., 206) that is linked to the parameter may be displayed to the user as a preview, for instance in a preview section of the window 201 or in a separate preview window. The input field widget and its associated label and unit label collectively represent an example of a widget collection. The preview shows the user what the new form may look like when the application data structure that is being created via the application builder wizard is executed.

It is contemplated that a new form created in the method step above does not have to be a "pure" input or output form. A new form that is added to an application data structure can also contain input forms, output forms, input widgets, and output widgets as constituents of the new form. For example, in some aspects, an alternative act after adding a text field widget may be to add a plot linked to a graphics widget (e.g., see elements 204a and 204b), to the new form.

Figure 6:
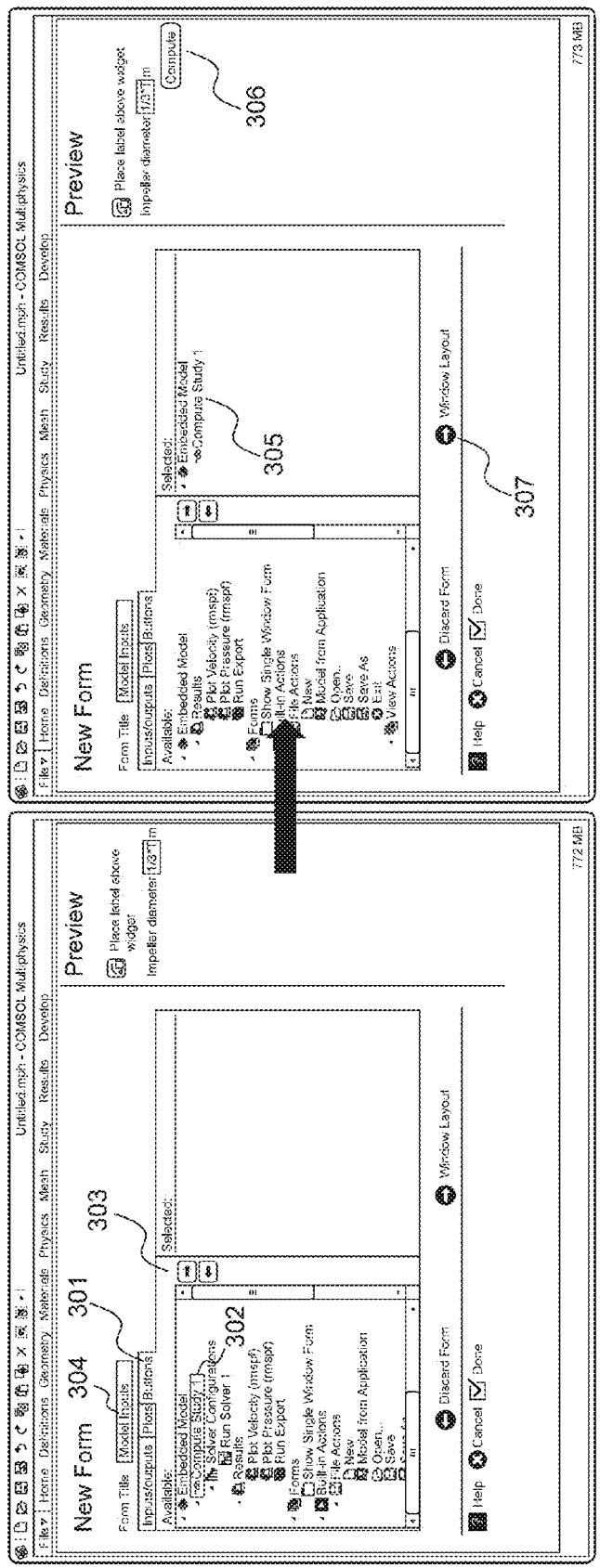
FIG. 6 illustrates a graphical user interface for adding a button widget to a new form and linking the widget to a command sequence in an embedded multiphysics model for a physical system, according to aspects of the present disclosure.

Referring now to FIG. 6, a graphical user interface is illustrated for another exemplary addition of an application feature, such as adding a button widget to a new form and linking the widget to a command sequence in an embedded multiphysics model of a physical system. The GUI provides an exemplary aspect of adding a command sequence and widget (see, e.g., elements 300 and 300a in FIG. 3) that can be created by the process of generating of an application data structure described for FIG. 3. In the exemplary new form illustrated in FIG. 6, a user selection of the button tab 301 can cause a list of commands to be displayed that may be added to a command sequence. The list can be dependent on commands available in the embedded multiphysics model. In one exemplary aspect, a "compute study" command 302, for running the multiphysics model that is embedded in the application data structure, may be selected 303 and linked to a button widget. The command 302 and link to the button widget are then added to the new form entitled "model inputs" in the form title box 304. This user-selected command sequence 305 along with a preview of the new form, now also including a "compute" button widget 306, can then be displayed to the user in the application builder wizard. Furthermore, in some aspect, the application builder wizard further includes a window layout button 307, that upon selection by a user, may show alternatives for how the new form should be displayed in the window form when the application data structure is executed.

Figure 7:
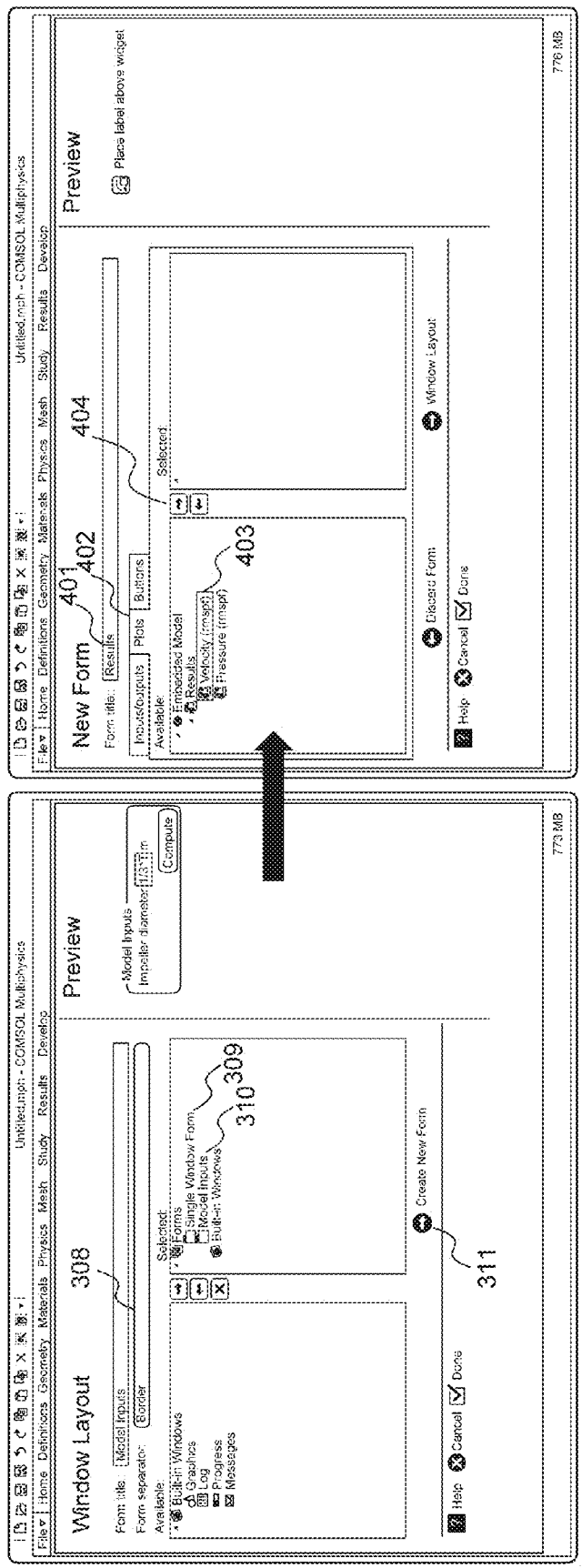
FIG. 7 illustrates a graphical user interface for selecting a form layout and for adding additional new forms in an application data structure according to aspects of the present disclosure.

Referring now to FIG. 7, another graphical user interface is illustrated for selecting a window layout and for adding additional new forms in an application data structure according to aspects of a method for creating an application. In the exemplary GUI, a user can select for the new form, "Model Inputs", options that alter the window layout for the exemplary application being built using the wizard. Furthermore, a user-selectable button 311 allows the user to create additional new forms in an application data structure. The GUI for selecting window layout options can include an application builder tree representation of previously created window forms 309, 310 (e.g., "Single Window Form" in element 503 of FIG. 8; "Model Inputs" in element 202 of FIG. 5). It is also contemplated that the GUI for selecting window layout options for an application data structure can include a combo box 308 for selecting the form separator around the created form, such as a border or title bar.

In some aspects, a user selection of the "create new form" button 311 in the window layout application builder wizard GUI may create an additional new form, for example an output form (see steps 400, 400a, 400b in FIG. 3). As discussed for the previous new form in FIGS. 5 and 6, a title for the second new form may be entered in the form title text box 401 (e.g., the title "results"). In further exemplary aspects of the new forms that may be added to an application data structure through the application builder wizard, a user may select a plots tab 402 and further select a plot group 403 from the results tree in the embedded multiphysics model (e.g., a "velocity" plot group in the mixer model). Next, by selecting an arrow button 404, the user can then add to the new form (e.g., the "results" form) a graphics widget linked to the selected plot group 403.

Figure 8:
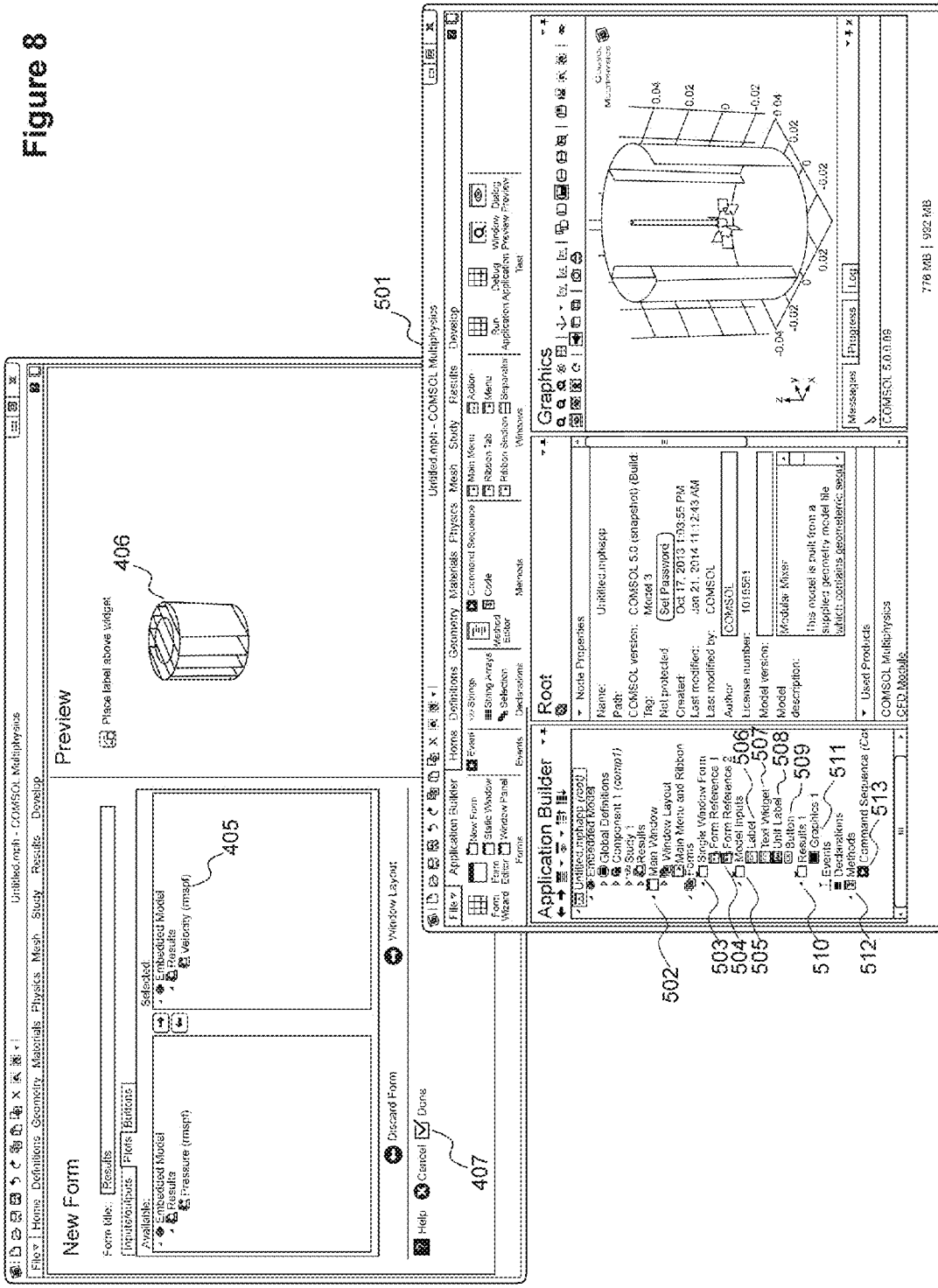
FIG. 8 illustrates a graphical user interface for adding an output form to an application data structure according to aspects of the present disclosure.

Referring now to FIG. 8, a graphical user interface is illustrated for another exemplary addition of an application feature, such as adding an output form to an application data structure according to aspects of a method for creating an application. As generally discussed above, a new form that is added can include other input forms, output forms, input widgets, and output widgets as constituents of the form. So, for example, a form does not have to be a pure output form and instead can include other constituents. In the exemplary aspect of a selected graphics widget linked to the velocity plot group 405 in the embedded mixer model illustrated in the GUI of FIG. 7, a preview 406 can be displayed in a new page for the output form. By a user then selecting on the "done" icon 407, the created output form is added to the application data structure and may also open a main user interface 501 in an application builder system using the application data structure that would have been created, such as in step 500 of FIG. 3.

It is contemplated that in some aspects, a user interface of an application builder system may include an application builder tree representing the initial application data structure and the operations that create a modified application data structure. For example, the main window 502 added in previous method steps of FIG. 3 (see step 100e) is shown in the main user interface 501 as a node together with a plurality of child nodes. In addition, the single window form 503, created together with the main window, contains two child nodes representing form references 504 to the two forms created in the application builder wizard.

The first exemplary form created with the application builder wizard, above in FIGS. 5 and 6, was the "Model Inputs" form 505 (see 201), which is represented by a node that includes child nodes for the label 506, the input field widget 507 for inputting the impeller diameter value, the unit label 508, and the button 509 for computing the command sequence for the study. The second exemplary form created with the application builder wizard, above in FIGS. 7 and 8, is the "Results" form 510, which includes the graphics widget

511 that displays the selected plot group when the application is executed. The "Methods" node 512 includes child nodes for the command sequence 513, which computes the study and updates the plot when the application is executed.

It is contemplated that each of the nodes in the application builder tree may include corresponding settings for the forms, events, declarations, and methods and their respective child nodes. Each of the nodes in the application builder tree may represent constituents and operations that may define an application in an application builder system.

FIGS. 8-18 illustrate exemplary aspects of an application builder system (e.g., Application Builder available from COMSOL) that includes an application data structure as created by the application builder wizard described above in the context of FIGS. 3-8. The application data structure created through the application builder wizard can be further defined and used in the application builder system, for further defining the new form(s) (and/or form features), command sequence(s), and widget(s) templates created with the application builder wizard.

The generated application data structure(s) can be used to provide a customized modeling of physical system(s) based on one or more modeling operations, one or more geometries of the model(s) of the physical system(s), and one or more application features, all defined in the application data structure that further includes a multiphysics model embedded therein.

Figure 9:
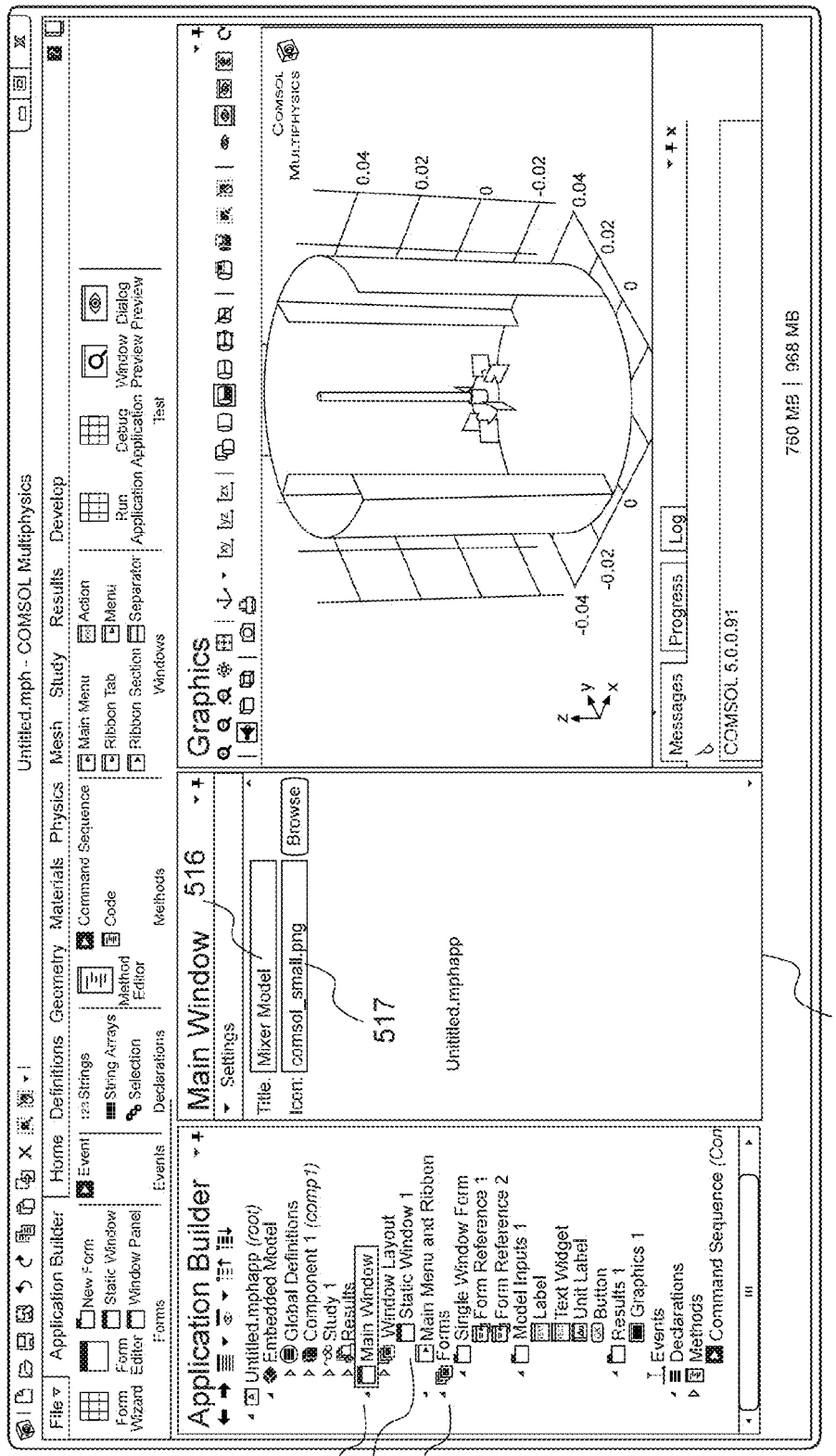
FIG. 9 illustrates a graphical user interface for an exemplary settings window for editing settings for a main window of a modeling application created using the application builder wizard according to aspects of the present disclosure.

Referring now to FIG. 9, a graphical user interface is illustrated for an exemplary settings window for editing settings for a main window (e.g., similar to main window 501) of an application according to aspects of a method for creating an application. A main window node 514 can include a corresponding settings window 515, which is shown in a settings window position in the application builder systems user interface when the corresponding node is selected in the application builder tree. The settings window can include a title text box 516 and an icon text box 517 where the name and path of an icon image file may be entered by the user of an application builder system. The title may be shown in the window bar and the icon image may be show in the corner of the widow frame when the application is executed.

It is contemplated that the main window node can include a static window child node 518 which may refer to the single window form. Several window references may be created as child nodes to the window layout node in order to create an application that contains several windows. In such case, several window forms may be created as child nodes to the forms-node instead of the single window form. Adding several windows in an application may allow for the detaching and reattaching of application windows when the application is executed.

Figure 10:
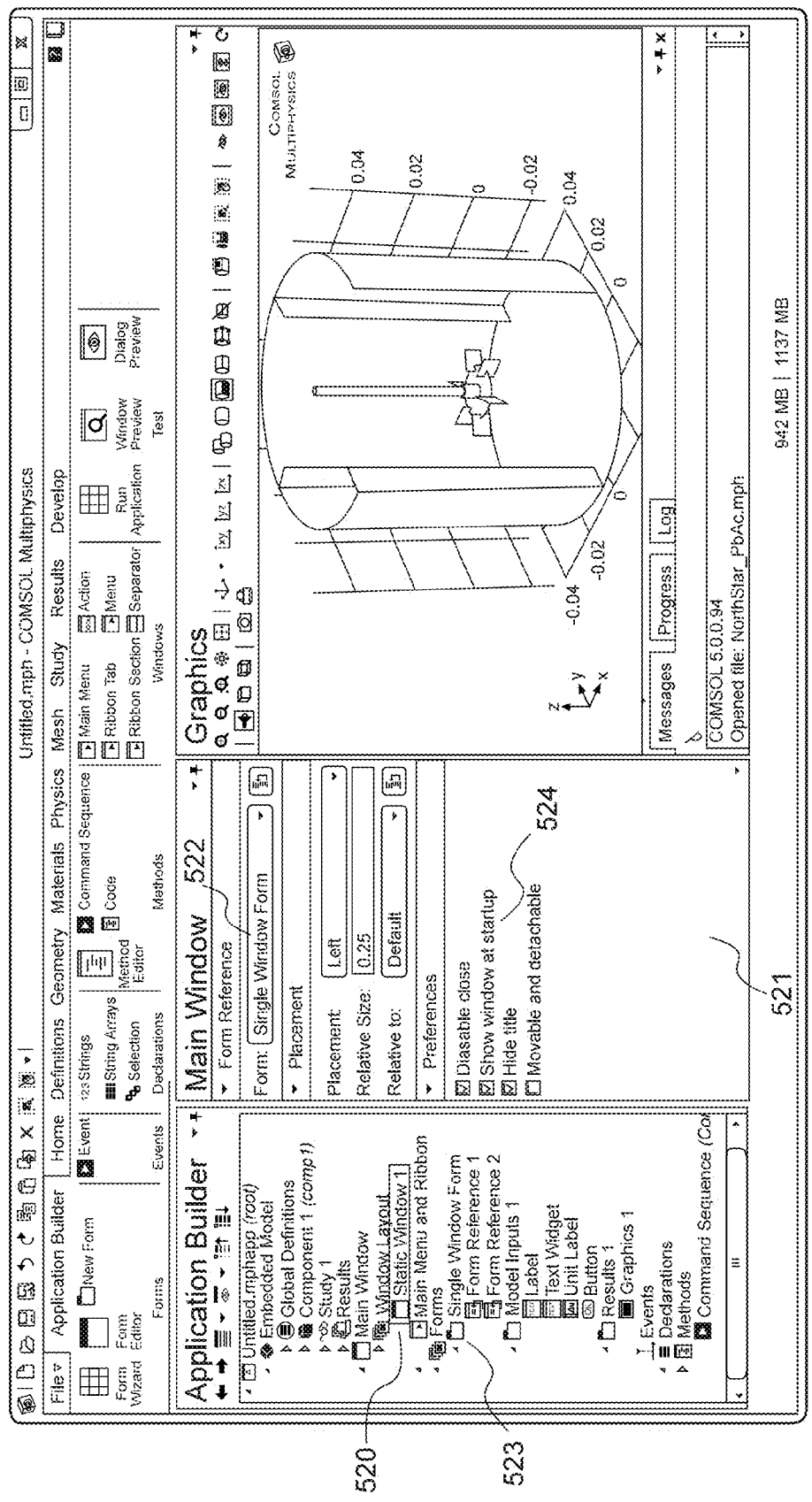
FIG. 10 illustrates a graphical user interface for an exemplary settings window for a static window node of a modeling application created using the application builder wizard, according to aspects of the present disclosure.

Referring now to FIG. 10, a graphical user interface is illustrated for an exemplary settings window 521 for a static window node 520 according to aspects of a method for creating an application. The settings window 521 can include a reference that links to a window form, for example the single window form 522, which may refer to the corresponding node 523. A preferences section 524 may allow settings such as showing the linked window when the application is started and hiding or showing the title of the linked window when the application is executed.

Figure 11:
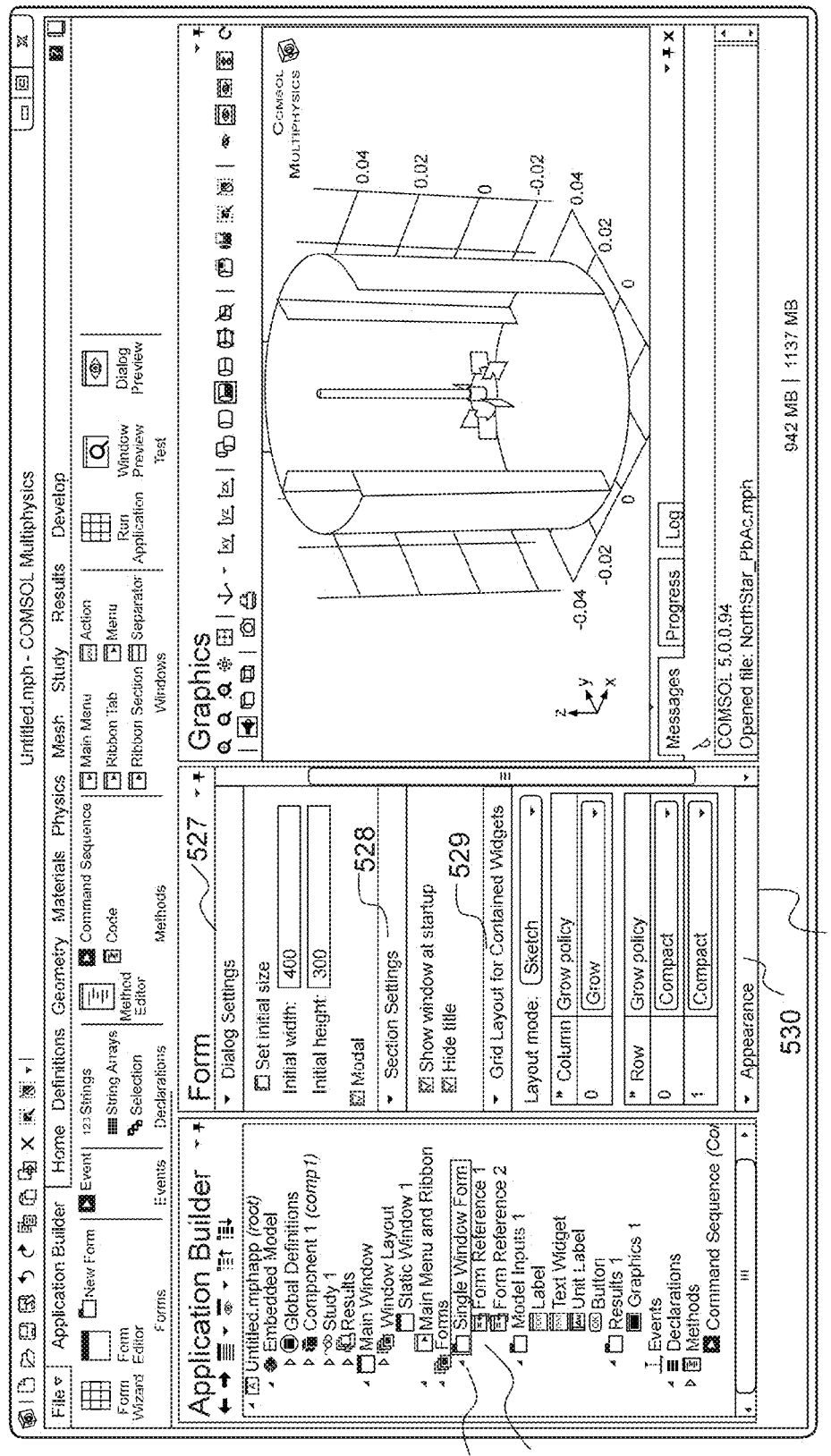
FIG. 11 illustrates a graphical user interface for an exemplary settings window for a single window form node of a modeling application created using the application builder wizard, according to aspects of the present disclosure.

Referring now to FIG. 11, a graphical user interface is illustrated for an exemplary single window form settings window 526 for a single window form node 525 (e.g., a window form) according to aspects of a method for creating an application. It is contemplated that a single window form can be created that includes other forms and widgets as a member or as reference(s) to other form(s). For example, the settings window 526 includes a title and an icon image reference, a dialog settings section 527 for defining an initial size, a section settings 528 for defining if the member section forms of the form should be expandable or initially collapsed, a grid layout section 529 for the positioning of the widgets that may be contained in the form, and an appearance section 530 for determining the foreground and background colors of the form. In this example, the single window form contains two exemplary references 531 to two member forms, the "model inputs" form and the "results" form.

Figure 12:
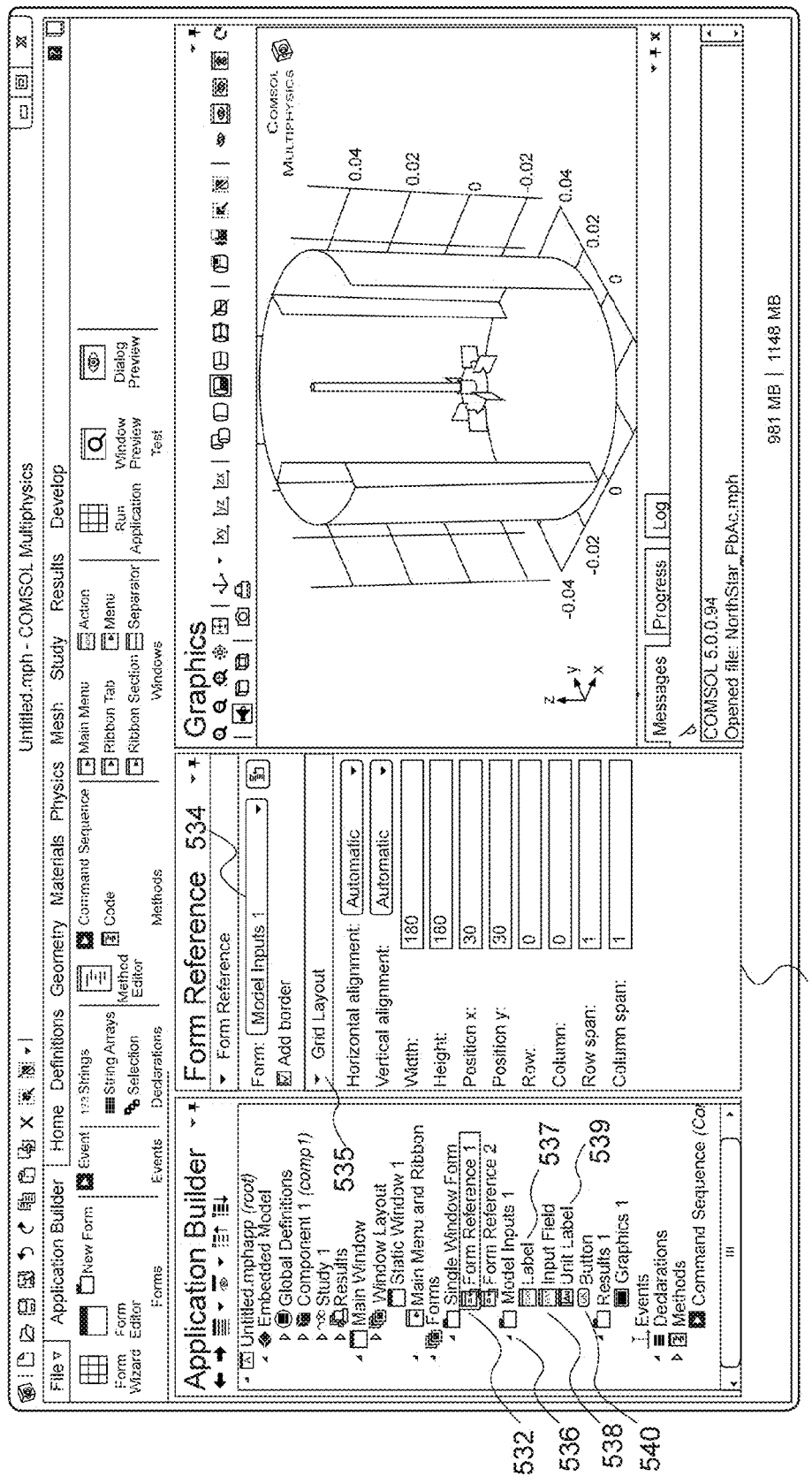
FIG. 12 illustrates a graphical user interface for an exemplary settings window for a form reference of a modeling application created using the application builder wizard, according to aspects of the present disclosure.

FIG. 12 illustrates a graphical user interface for an exemplary form settings window 533 for a form reference 532 according to aspects of a method for creating an application. A settings window (e.g., 533) for a form reference (e.g., node 532 referring to "Form Reference 1") can include a reference combo box (e.g., 534) for selecting a linked form from a list of selectable forms. For example combo box 534 illustrates a linked form that is the model inputs form 536. The model inputs form 536 can also include the same settings as the single window form described above for FIG. 11. The model inputs form 536 can further include widgets for the label (e.g., 537), the input field (e.g., 538), and the unit label (e.g., 539), that were created in the previous method steps (e.g., 204, 205, and 206) described in the context of FIG. 5. The model inputs form 536 can also include the button widget (e.g., 540) created in the previous steps (e.g., 303, 304, 305, and 306) described in the context of FIG. 6.

Additional details for exemplary aspects of the label, input field, unit label, and button widget are described in the context of FIGS. 13-16.

Figure 13:
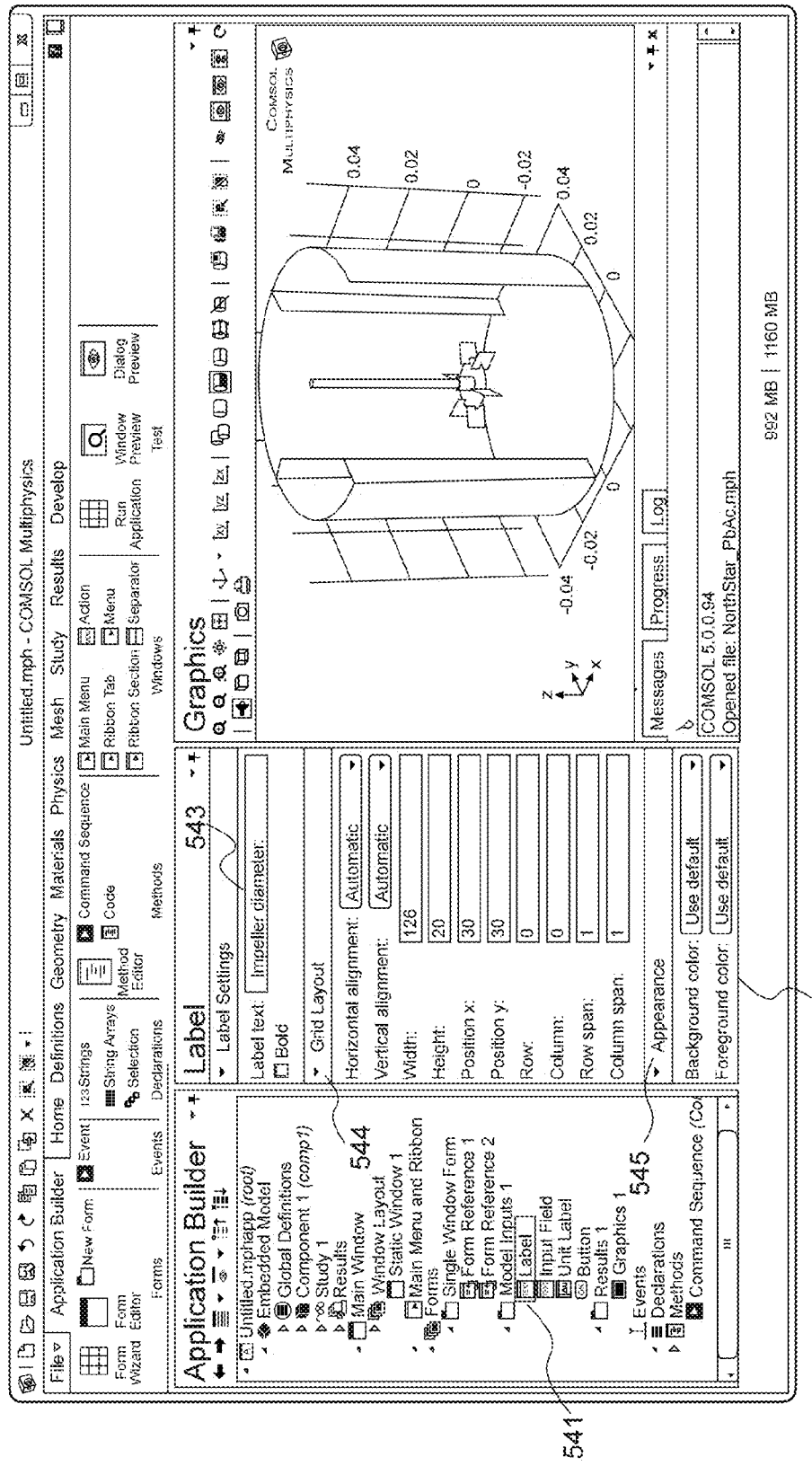
FIG. 13 illustrates a graphical user interface for an exemplary settings window for a label widget of a modeling application created using the application builder wizard, according to aspects of the present disclosure.

Referring now to FIG. 13, a graphical user interface is illustrated for an exemplary label settings window 542 for a label widget 541 according to aspects of a method for creating an application. The label text 543 can be entered manually or derived from the description in the linked parameter in the embedded multiphysics model (see, e.g., previous method steps 204, 205, and 206 in FIG. 5).

Figure 14:
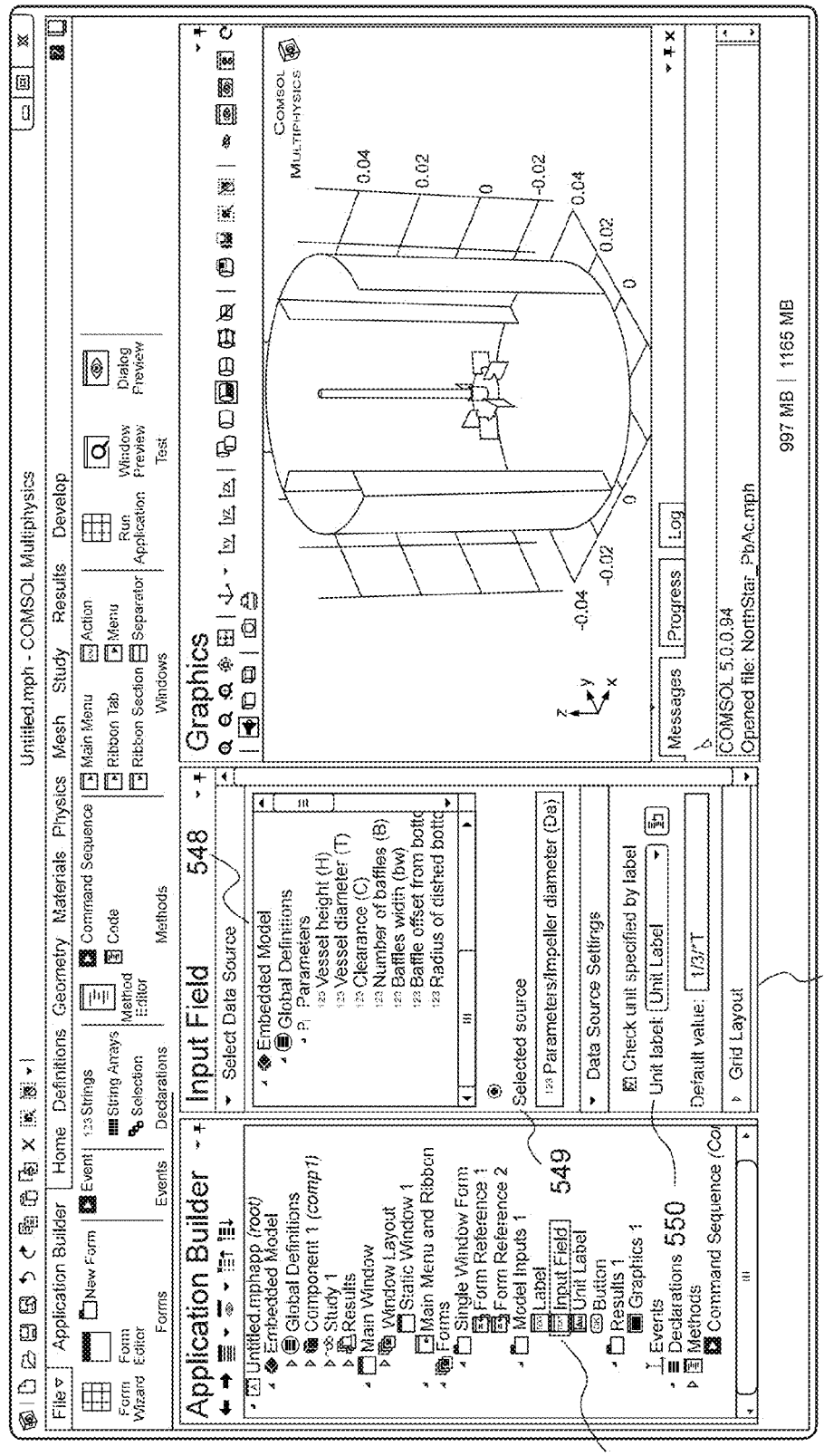
FIG. 14 illustrates a graphical user interface for an exemplary settings window for an input field widget of a modeling application created using the application builder wizard, according to aspects of the present disclosure.

Referring now to FIG. 14, a graphical user interface is illustrated for an exemplary input field settings window 547 for an input field widget 546 according to aspects of a method for creating an application. It is contemplated that the input field node can include a reference to a linked selected data source in the embedded multiphysics model 549, which may be a parameter or a variable in the embedded model selected from a replica of the parameter and variable branches in the model tree (e.g., element 548). A data source settings section 550 of the settings window 547 can also include settings for unit labels, which may be linked to a unit label node along with a default values text box, which may derive its value from the parameter or variable list from the embedded model.

Figure 15:
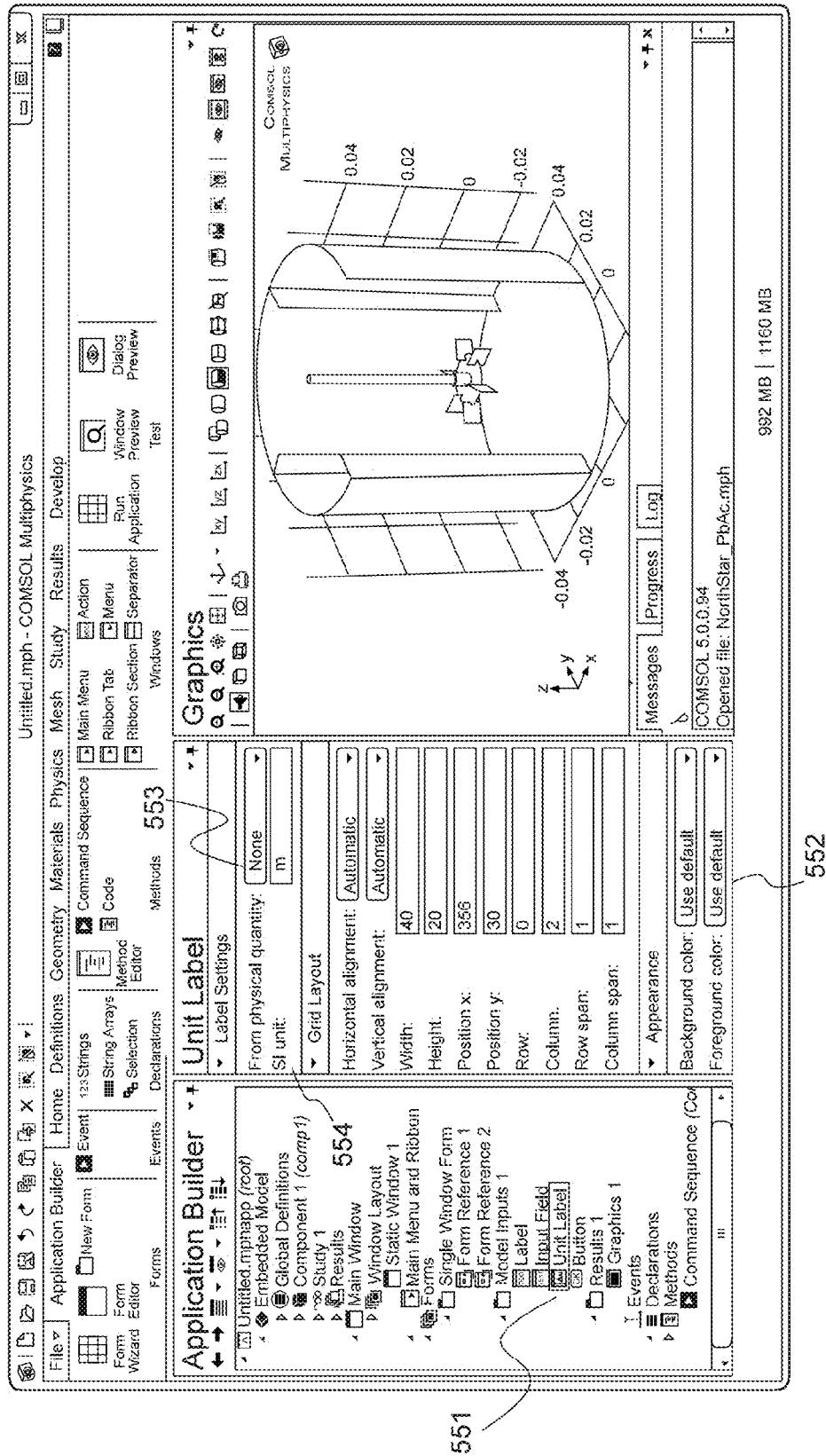
FIG. 15 illustrates a graphical user interface for an exemplary settings window for a unit label widget of a modeling application created using the application builder wizard, according to aspects of the present disclosure.

Referring now to FIG. 15, a graphical user interface is illustrated for an exemplary unit label settings window 552 for a unit label widget according to aspects of a method for creating an application. The unit label node 551 can be linked to an input field widget (e.g., element 550 in FIG. 14). The unit in the unit label can be manually selected from a list of physical quantities 553 and may also update a unit text box 554 (e.g., SI unit text box).

Figure 16:
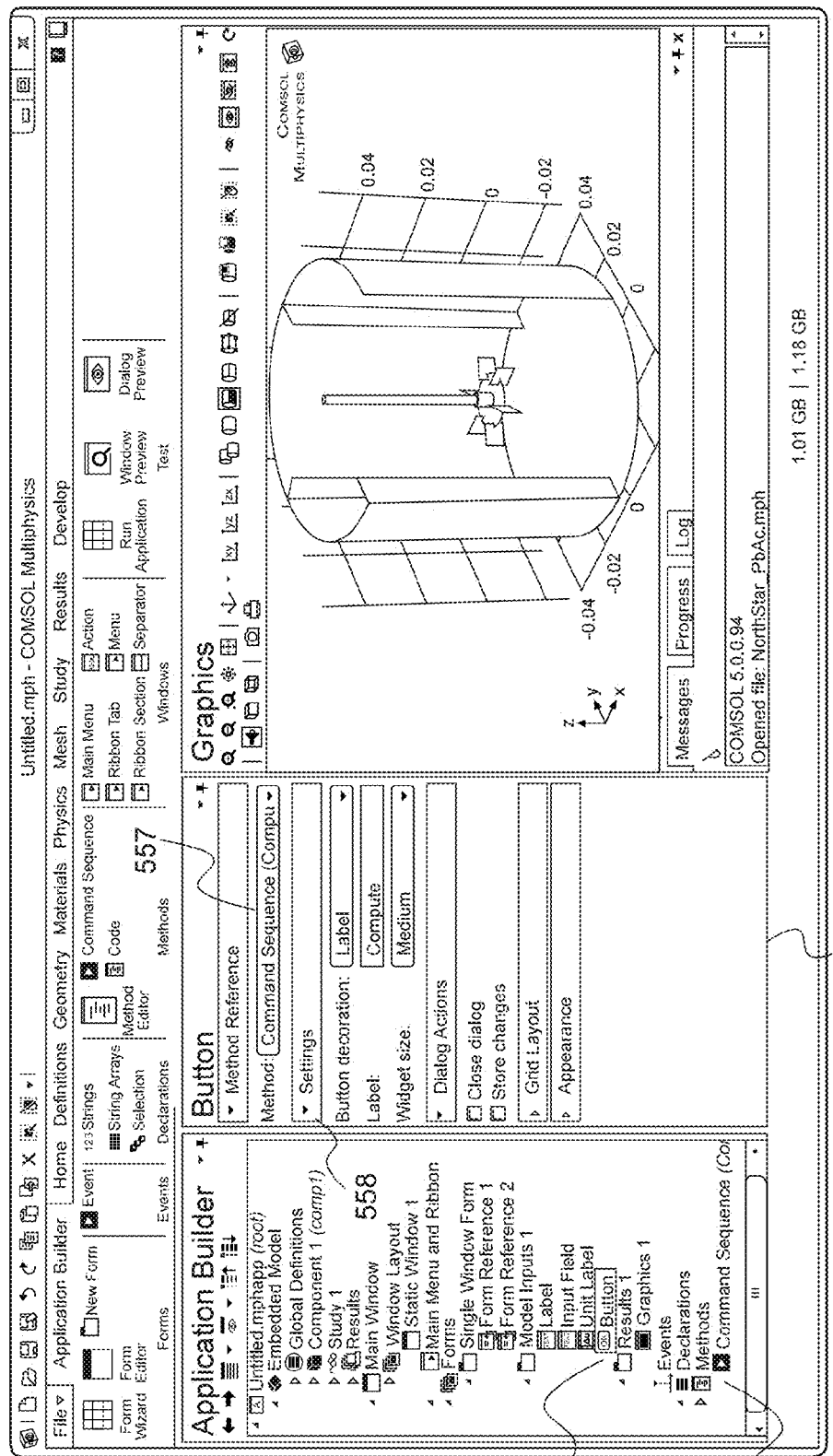
FIG. 16 illustrates a graphical user interface for an exemplary settings window for a button widget of a modeling application created using the application builder wizard, according to aspects of the present disclosure.

Referring now to FIG. 16, a graphical user interface is illustrated for an exemplary button settings window 556 for a button widget 555 according to aspects of a method for creating an application. The button widget settings can include a reference to a method that is selected from a list of available methods 557. In the illustrated exemplary aspect, a command sequence method reference 559 was selected that implements a simulation of the mixer and plots the velocity field when the button is selected during the execution of the application.

Figure 17:
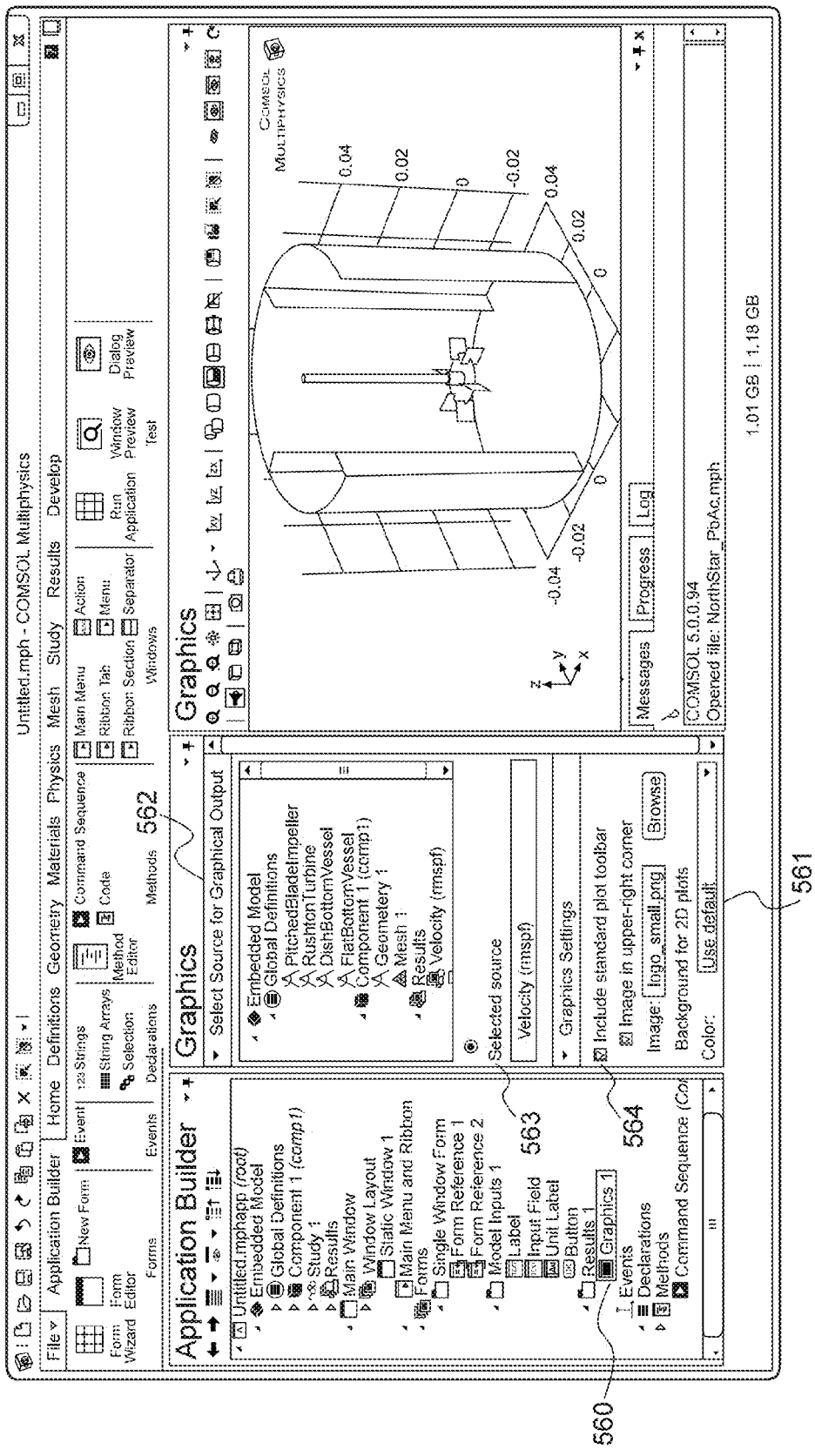
FIG. 17 illustrates a graphical user interface for an exemplary settings window for a graphics widget of an application of a modeling application created using the application builder wizard, according to aspects of the present disclosure.

Referring now to FIG. 17, a graphical user interface is illustrated for an exemplary graphics settings window 561 for a graphics widget 560 of an application according to aspects of a method for creating an application data structure. The displayed graphics settings window can include a replica of the geometries, mesh, and results branches of the model tree (e.g., element 562) of the embedded model. Furthermore, the graphics settings window can also be linked to the graphics widget 560 as the source for the output. In the displayed exemplary aspect, the selected source 563 is a velocity plot group that may show the flow pattern in the exemplary mixer discussed throughout the present disclosure. The graphics settings 564 can allow for a selection of a logo positioned in a corner of the graphics window and a background color, which may be shown when the application defined in the application data structure is executed.

Figure 18:
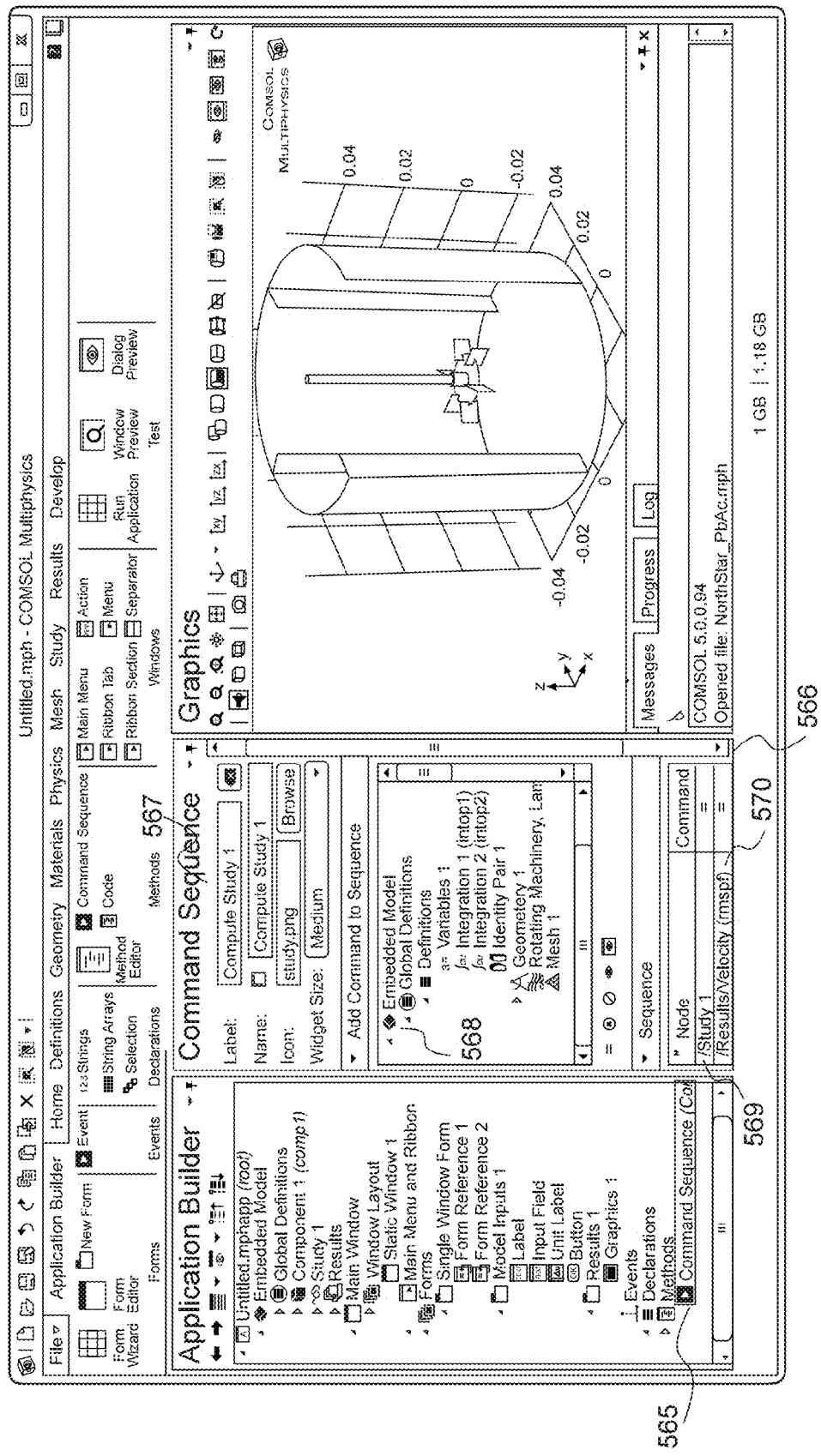
FIG. 18 illustrates a graphical user interface for an exemplary settings window for a command sequence method of a modeling application created using the application builder wizard, according to aspects of the present disclosure.

Referring now to FIG. 18, a graphical user interface is illustrated for an exemplary command sequence settings window 566 for a command sequence method 565 of an application according to aspects of a method for creating an application data structure. The command sequence can include a label setting 567 (e.g., "Compute Study 1"), a name setting (e.g., "Compute Study 1"), an icon setting (e.g., "study.png"), and size settings (e.g., "Medium"). Commands can be added to a command sequence through user selections of commands displayed from a replica of the embedded multiphysics model's model tree (e.g., see element 568). The sequence of commands can be inspected from a displayed sequence list. For example, the exemplary command sequence settings window 566 includes a command for implementing a study 569 (e.g., "/Study 1") and a command that plots the velocity field plot group 570 (e.g., /Results/Velocity (rmspf)"). The command sequence can be implemented by a widget, such as a displayed user-selectable button that is linked to the command sequence (see, e.g., FIG. 16). Selection of the button during execution of the application implements the command sequence.

As discussed previously, it is contemplated that an application data structure generated using the described aspects of an application builder wizard can be extended to a main user interface (i.e., outside of the application builder wizard) of an application builder system to allow the creation or addition of new windows, forms, events, declarations, and methods.

Figure 19:
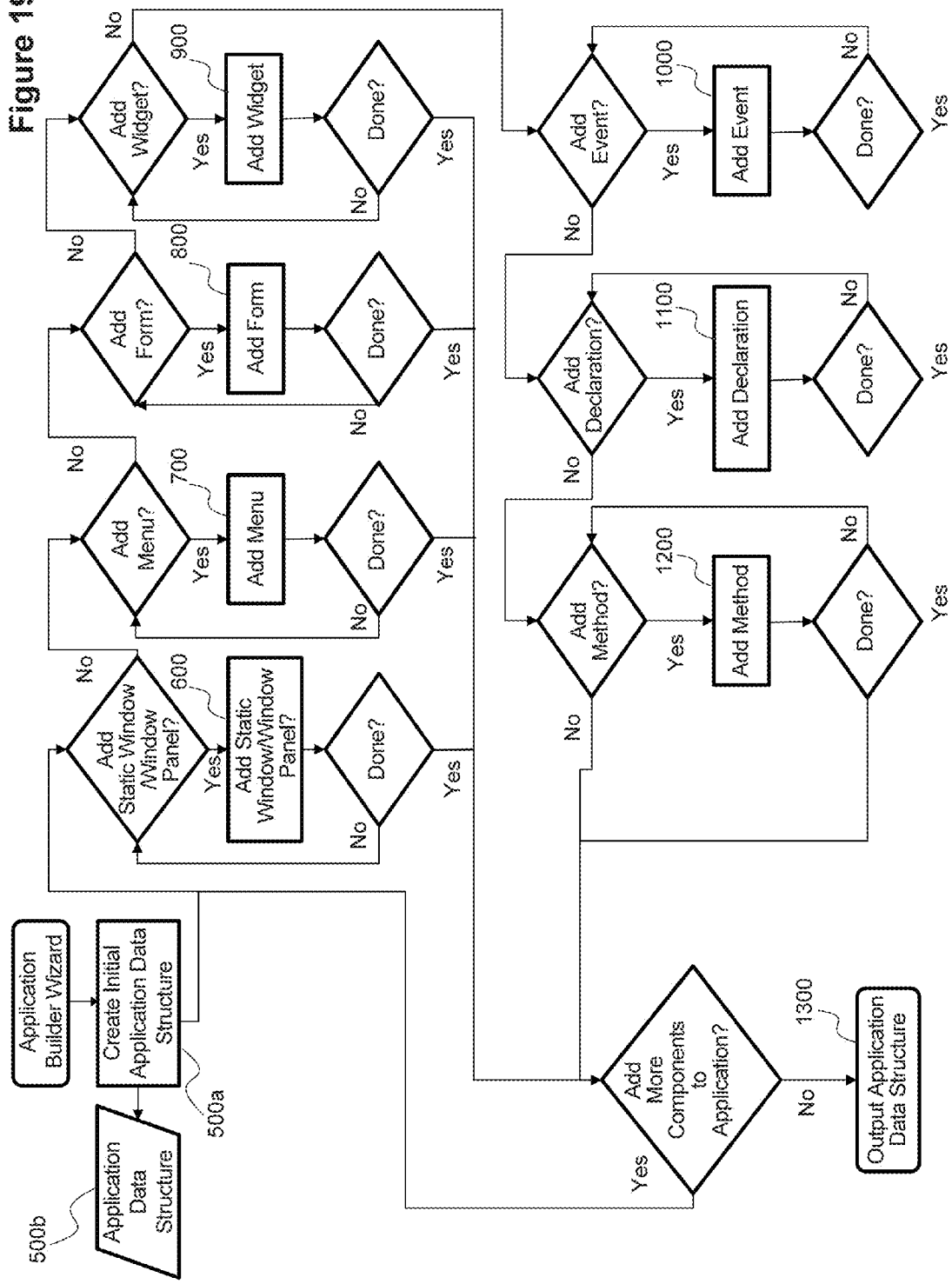
FIG. 19 illustrates a flowchart for exemplary aspects of a method for modifying an initial application data structure, according to aspects of the present disclosure.

Referring now to FIG. 19, a flowchart illustrates exemplary aspects of a method for modifying an initial application data structure. The initial application data structure can be created using the application builder wizard. It is also contemplated that the initial application data structure may have been previously created by saving a multiphysics model as an application onto a memory device. The method steps described for FIG. 19 can be accessed as user-selectable options on a user interface in an application builder system. Follow execution of the method steps, the resulting application data structure generates a customized application that accesses methods in a multiphysics modeling system for controlling selected settings in a multiphysics model and implements simulations in the multiphysics modeling system.

At step 500a, the initial application data structure that a user of the application builder system wishes to extend is created or loaded into the application builder system. Following the creation or loading of the initial application data structure, an application builder tree and a preview of the application may be displayed in the user interface for the application builder system. In some aspects, the preview provides a display of how the application user interface is displayed to the user when the application is executed.

Next, at step 600, a static window or a window panel is added to an already available main window or desktop window. In some aspects, a main window, or desktop window, is a specific type of form that defines one or several frames in a computer desktop where other forms may be displayed when an application is executed. An example of a main window is illustrated in FIG. 9 as element 515. A main window can be created automatically by an application builder system when a model is saved as an application, and in some aspects, the main window may already be available in the application data structure 500b used to create the initial application data structure. A static window can define one frame in a main window, or desktop window, where other forms and widgets are positioned in rows and columns. An example of a static window is illustrated in FIG. 10 as element 521. The member forms and widgets can be positioned by reference. A static window may be the default window for an application that only includes one window inside the main window or desktop window. Such a window may not be resized or detached. A static window can be created automatically by an application builder system when a model is saved as an application, and in some aspects, may already be available in the application data structure 500b. A window panel can define one frame in a main window, or desktop window, where other forms and widgets may be positioned in rows and columns. The difference compared to the static window may be that windows positioned in a window panel may be detached and resized. The member forms and widgets in a window panel may be positioned by reference, where the member forms and widgets may be linked to the window panel.

Next, at step 700, a menu is added to the application data structure according to some aspects. A main menu may be another type of available form in an application builder system that can include references to widgets. A menu may be accessed in a toolbar in a main window or in a desktop window when the application is executed. A menu may also be a tabbed toolbar menu (e.g., a ribbon menu by Microsoft® which may show when the application is executed on a Windows® system). A main menu can include actions as child nodes that may be linked to command sequences and methods and to widgets, such as a button, which may execute the action when selected by a user during execution of the application.

Next, at step 800, a form can be added to an application data structure. A form can include a collection of member forms and widgets to achieve a desired layout for an application's user interface. Members in a form can be added by reference to input and output forms or by directly adding input forms, output forms, and widgets as child nodes to the parent form. Several types of forms may be available in an application builder system. For example, a window form is a form that includes other forms and widgets as member forms. The member forms and widgets can be linked to the window form or they can be child nodes to the window form in the application builder tree. A window form may be linked to a static window or to a window panel to get a specific position in a main window or desktop when the application is executed.

Next, in step 900, a widget can be added to the application data structure. A widget can be a member widget in a windows form or panel form. An application builder system can include a number of basic widgets that may be combined in different forms. Basic widgets may be an input field (e.g., see element 546 from FIG. 14), a combo box, a check box, a button (e.g., see element 555 from FIG. 16), or data display widgets. These basic widgets can be combined with label widgets. Label widgets can include a pure label widget (e.g., element 541 from FIG. 13), a unit label (e.g., element 551 from FIG. 15) that can be entered manually or linked to a unit of a physical quantity, or an equation label that can receive equation inputs in the form of mathematical typesetting formats, such as TeX and LaTeX. It is also contemplated that an application builder system can include graphics widgets (e.g., see element 560 from FIG. 17) along with image widgets to output images in an image format from a graphics display.

An application builder system can also include a number of list widgets, such as list box, radio button, and table widgets. A list box is a widget that accepts a number of values for an input shown in a drop-down list. It can be used to select from a number of fixed predefined options for setting in the embedded model when the application is executed. A list box can also be linked to an event that may hide or show different forms depending on the option selected by a user when the application is executed. A radio buttons list can present a fixed number of options for an input where only one option may be selected at the time. A radio button may be used to select options in an embedded model when the application is executed. A table widget is a widget designed to accept a number of inputs in rows and columns when the application is executed. These inputs can be linked to parameters, variables, and operations in the embedded model.

It is further contemplated that an application builder system can include panels where other member widgets are positioned. Such panels can be grid, form reference, section form, tabbed pane, or card stack panels. A grid panel can position a number of widgets in a grid structure with rows and columns. A form reference panel may create a link to another form and may also determine the position and size of a linked form (e.g., see element 532 from FIG. 12). A section form panel can be used to divide a window form into several sections. Such a section form panel may have a heading bar containing for example a description and the member forms placed beneath the bar. The member forms may be linked using a list of available forms in an application builder system. A tabbed panel can arrange several other forms and panels into one new form. In some aspects, several forms can be displayed above each other in a desktop window or settings window. Such forms may be selected using tabs when an application is executed. The member forms may be linked using a list of available forms in an application builder system. A card stack panel can include a number of predefined forms that may be shown depending on the selection made by a user when the application is executed. Only one member of the forms that is member in a card stack may be active at a given time when an application containing such a form collection is executed. Controlling which of the forms in a card stack that may be displayed can be accomplished using events, which are described in more detail below in the context of step 1000. The member forms can be linked using a list of available forms in an application builder system.

In some aspects of an application builder system, ready-made forms are included for specific purposes. The ready-made forms can include other forms and widgets. Examples of such form collections can include text forms, which may combine input field and labels; vectors forms for vector inputs; data display forms, which may combine data displays and labels; combo box forms, including combo box and labels; selection forms; and coordinate picker forms. Other more specific forms and widgets can include a progress bar, a slider, a toolbar, a dialog button form, or a filler widget. A selection form can allow linking a graphical input—completed by selecting domains, boundaries, edges, and points when the application is executed—to a selection defined in the embedded model. For example, a selection defined as an impeller surface can be used as input for a rotating wall boundary condition in the embedded model. The impeller surface selection list can be populated manually by a user of the application, thus getting the appropriate boundary conditions linked automatically for an arbitrary impeller geometry. The selection input widget thus allows for setting domain equations and boundary conditions, defined in the embedded model, using arbitrary geometries when the application is executed. A coordinate picker widget can receive graphical inputs from an application user clicking or providing selections on the graphics canvas causing an output of a string array including the coordinates for the clicked or selected points. The string data output can be used as inputs into other widgets and forms that may be linked to settings in the embedded model. A progress bar widget can receive a value from a parameter or variable used in a parametric sweep in the embedded model and output the progress of the model simulation, when the application is executed, based on the total number of variable values. A slider is an input widget that receives the value of a parameter (e.g., a parameter in the embedded model). A filler widget can be used to define an area in a form, with a specified size and background color, where no other forms may be shown during the execution of the application. The widget is used to align widgets and empty parts of a window or form during the execution of the application.

The method for modifying an application data structure described in FIG. 19, next proceeds to step 1000, where an event can be added to the application data structure. An event can specify a logical condition that checks the value of an input declaration. For an input or an output form, such condition determines if the form will be enabled or disabled in the form window when the application is executed. A disabled form can either be hidden from the window or just grayed-out.

Next, at step 1100, a declaration can be added to an application data structure. Declarations can declare data fields that cannot be changed by a user when the application is executed. Instead the data fields are used for reading values from the application or embedded model. For example, a data field may obtain its value indirectly, based on a selection received from the user in an input widget, such as a combo box or radio button. Such data field value(s) are then used in an if-statement that may show different options depending on the value during execution of the application. An output data field may be used for displaying the result from an evaluation in the embedded model during application execution.

Next, at step 1200, a method can be added to an application data structure. A method defines a command sequence of operations and may be executed from an input form, for example, when a button is selected by a system user, during the execution of an application. A command sequence can include an update of an output form, for example an update of a plot in the embedded model, which may then generate a new plot in a graphics window in an application, for example using a canvas window. It is also contemplated that a method can include code snippet(s) (e.g., subroutines including limited instructions for specific tasks) that when executed, during the implementation of the application, control and run commands that control forms, widgets, events, declarations, or commands defined in the application data structure and in the embedded model.

Then, at step 1300, the modified application data structure is generated as output from the above described methods beginning with step 500 and continuing through one or more of steps 600, 700, 800, 900, 1000, 1100, and 1200. It is contemplated that the intermediate steps (e.g., steps. 600-1200) of FIG. 19 can be implemented in any order and that the steps can be repeated by the system user until the desired application design is achieved that allows for the customized modeling of physical systems on a multiphysics modeling system.

It is contemplated that at every step 600, 700, 800, 900, 1000, 1100, 1200 when an addition is made that the application data structure 500b (that is initially created in step 500a) can be updated, as well, into a modified application data structure. If no additions are made in steps 600, 700, 800, 900, 1000, 1100, 1200, then it is contemplated that the application data structure that is output in step 1300 will be the same as the application data structure 500b.

It is further contemplated that the generated application data structure can include the multiphysics model data structure as an embedded model, from the model that the application is based upon, together with a hierarchy that represent the nodes generated by the method steps described for FIG. 19. Furthermore, the deployment step of a finalized application data structure can also include storing the finalized application data structure in a new or in an existing library. A library can represent a real folder structure on a file system, or in a network. Any of the existing libraries can be accessed by the systems that create a multiphysics model data structure based on an application data structure.

Figure 20:
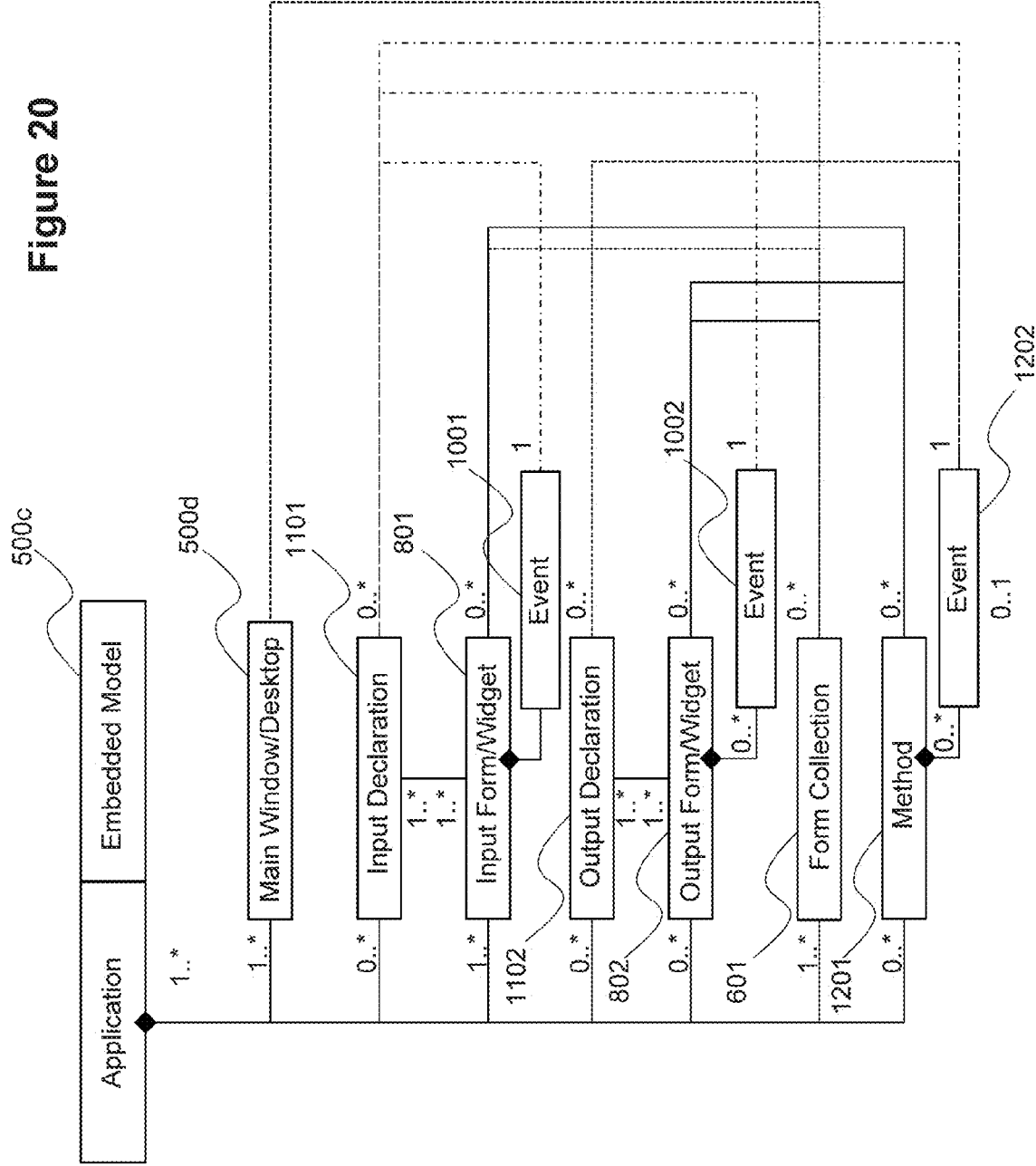
FIG. 20 illustrates an exemplary unified modeling language (UML) object diagram of instance level relationships between components according to aspects of an application data structure created and modified by the method of FIG. 3.

Referring now to FIG. 20, an exemplary unified modeling language (UML) object diagram is illustrated of instance level relationships between components according to one aspect of an application data structure created by the method described earlier for FIG. 3. FIG. 20 illustrates an end result or the outputted application data structure created through the application builder wizard. FIG. 20 also provides a schematic or object diagram of the relationships between the features illustrated in FIGS. 9-18, and thus, it is contemplated that FIG. 20 can also provide a schematic of the data structure for the application builder.

As illustrated in the object diagram of FIG. 20, an application data structure includes at least one embedded model 500c and at least one main window or desktop 500d. An application data structure can further include at least one form collection 601, such as a static window or window panel that may include a menu, which can also be considered a form collection. An application data structure can further include one or several forms (and/or form features), such as input forms and widgets 801, and input declarations 1101, which may be linked with a corresponding event 1001. An application data structure can also include output forms or widgets 802 along with anywhere from zero or several output declarations 1102 that in some aspect include a corresponding event 1002. Anywhere from zero to several methods 1201 are contemplated that may be included in an application data structure along with a corresponding event 1003. Forms, widgets, events, and methods may be linked with parameters, variables, operations, and settings in the embedded model 500c.

Figure 21:
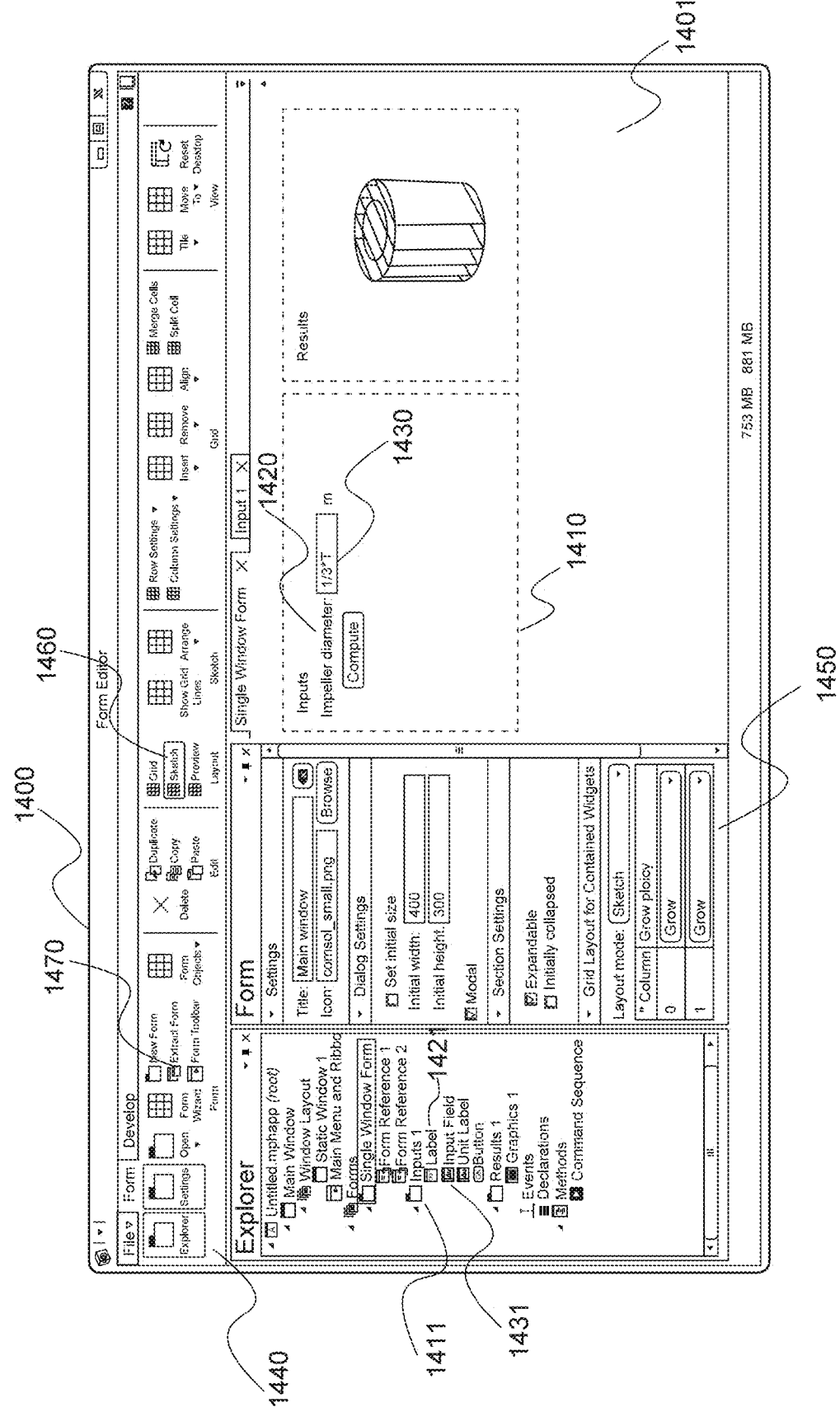
FIG. 21 illustrates a graphical user interface for positioning input forms, output forms, and form collections in a window form according to aspects of the present disclosure.

Referring now to FIG. 21, a graphical user interface 1400 is illustrated that is a form editor for creating input forms, output forms, and form collections according to aspects of a method for creating an application data structure. The illustrated graphical user interface 1400 is the output of an exemplary application data structure created with the application builder wizard and viewed through the form editor of an application builder system. The graphical user interface 1400 provides for interactive drawing and positioning of forms 1410, 1411 and widgets, such as labels 1420, 1421, input fields 1430, 1431, and other forms and widgets. Snapping may also assist the user of the tool in positioning the forms and widgets.

A toolbar 1440 can also include buttons and controls for showing and adding forms and widgets. There may also be an alternative to add forms and widgets in the application builder tree by right-clicking a node and selecting from a context menu. When a form or widget node is selected in the application builder tree, such as an input field 1431, its layout 1430 may be shown in a graphics builder window 1401 allowing for user positioning in the corresponding form or widget collection interactively. An additional layout section may also be shown in the settings window 1450 for widget and form features. In this layout section the values for the layout information may be set; for example, position, width, and height of a form or widget. These values may be updated automatically with interactive changes in the graphics builder window.

A graphics builder window 1401 provides a preview of an application in the application builder system when the application is executed. Thus, what is previewed in window 1401 is what a user of an application will see upon execution of the application that is created in the application builder system, which in this case was also created using the application builder wizard.

In some aspects, relative positioning may be used where, for example, a first form or widget may be placed freely on a form collection while other forms and widgets are then typically placed relative to the first form or widget with the aid of horizontal and vertical snapping. Vertical snapping and horizontal snapping may be mutually independent, and each form or widget may contribute with several vertical and horizontal snapping lines. All forms or widgets can contribute with a horizontal snapping line along their left edge. Forms or widgets with a fixed width, such as buttons, combo boxes, and text boxes, may contribute with a horizontal snapping line also along their right edge.

There may also be a row spacing that can be specified as a preference for the graphics builder window and that may typically have a default value of about five pixels. The row spacing may specify how much empty space there should be from the bottom of one form or widget to the top of the next. It may be used to decide where to position the form or widget on the row immediately below an existing form or widget. This row spacing may contribute with vertical snapping lines above and below a form or widget, making it easy to start a new row of forms or widgets above or below existing widgets.

When a user of the application builder system moves and resizes widgets, the snapping may try to align the left edge of the widget with the left edge of other widgets or the right edge of the widget with the right edge of other widgets and similarly in the vertical direction. While moving or resizing a widget, vertical and/or horizontal snapping lines may be drawn in the graphics builder window when snapping occurs. The snapping hot zone may be about 6-7 pixels in each direction of the snapping line so even though snapping is on it is possible to place the form or widget freely by positioning it outside the hot zone of any snapping line.

A form or a widget may be selected in the graphics builder window by clicking on them. Several forms or widgets may be selected by pressing the Ctrl key while clicking. Clicking on an already selected form or widget, while pressing the Ctrl key, may toggle the selection. There may also be a box selection tool that allows the user of the application builder to select several widgets by enclosing them with a rectangle. When a widget is selected, a highlight rectangle with some resize handles may be drawn around it 1410. By clicking and dragging in the interior of the widget it may be possible to move the widget. Horizontal and vertical snapping to other widgets in the form may be available both when moving and resizing widgets.

There may be a two-way synchronization between the selection in the application tree and in the graphics builder window. If a form or widget node is selected in the application tree (1431), the corresponding form or widget may be selected in the graphics builder window (1430) and vice versa. Since multiple forms and widgets may be selected in the graphics builder window but only one set of settings for one form or widget can be shown in the settings window at the time, controls for changing width and height may also be available on the toolbar. When multiple forms or widgets are selected there may also be toolbar buttons for the following operations: Aligning the left, right, top, bottom, or center of the selected forms or widgets; distributing the widgets with equal spacing horizontally or vertically; and giving the widgets equal width or height. It may also be possible to change the text displayed on labels, check boxes, buttons, and so on by double-clicking on the form or widget in the graphics builder window and then just entering the new text inline within the form or widget. Copy and paste may also be available to be able to easily reuse form and widget configurations in another form collection.

The graphics builder window may also have an automatic row and column creation. At each unique left border of a form or widget a new column may start and at each unique top border a new row may start. Because of the snapping used when drawing the forms and widgets, rather few rows and columns need to be created. Based on the width and height of a form or widget it may also be allowed to span several rows and columns. If several forms or widgets in a column have the same width as the form or widget with the maximum width in the column, these forms and widgets may be set to fill the column. This may be useful for getting several text boxes and combo boxes in a column with a straight right edge. The automatically created rows and columns may also be individual elements in the graphics builder window (1401), which can be selected by entering a grid layout mode by clicking the corresponding button in the toolbar (1460). A selected row may then be moved interactively up and down the other rows. For a selected column, a user of the application builder may then specify a fixed width or that the width should adapt to the width of the top level form if this is resized. There may also be tools such as insert row and delete row to easily make room for a new row or delete all forms or widgets in a row and compact the layout accordingly.

A form and a widget collection may contain many forms and widgets and the grid layout may become fairly complex as new forms and widgets are added to the form collection. In such cases, it may be convenient to divide the form collection into several form collections with individual layout management and then place these as child form collections in the original form. In such cases, it may be possible to enclose a couple of forms and widgets in a form collection using a rectangle and then use an extract toolbar button (1470) to specify that those forms and widgets should be extracted to their own form collection.

Figure 22:
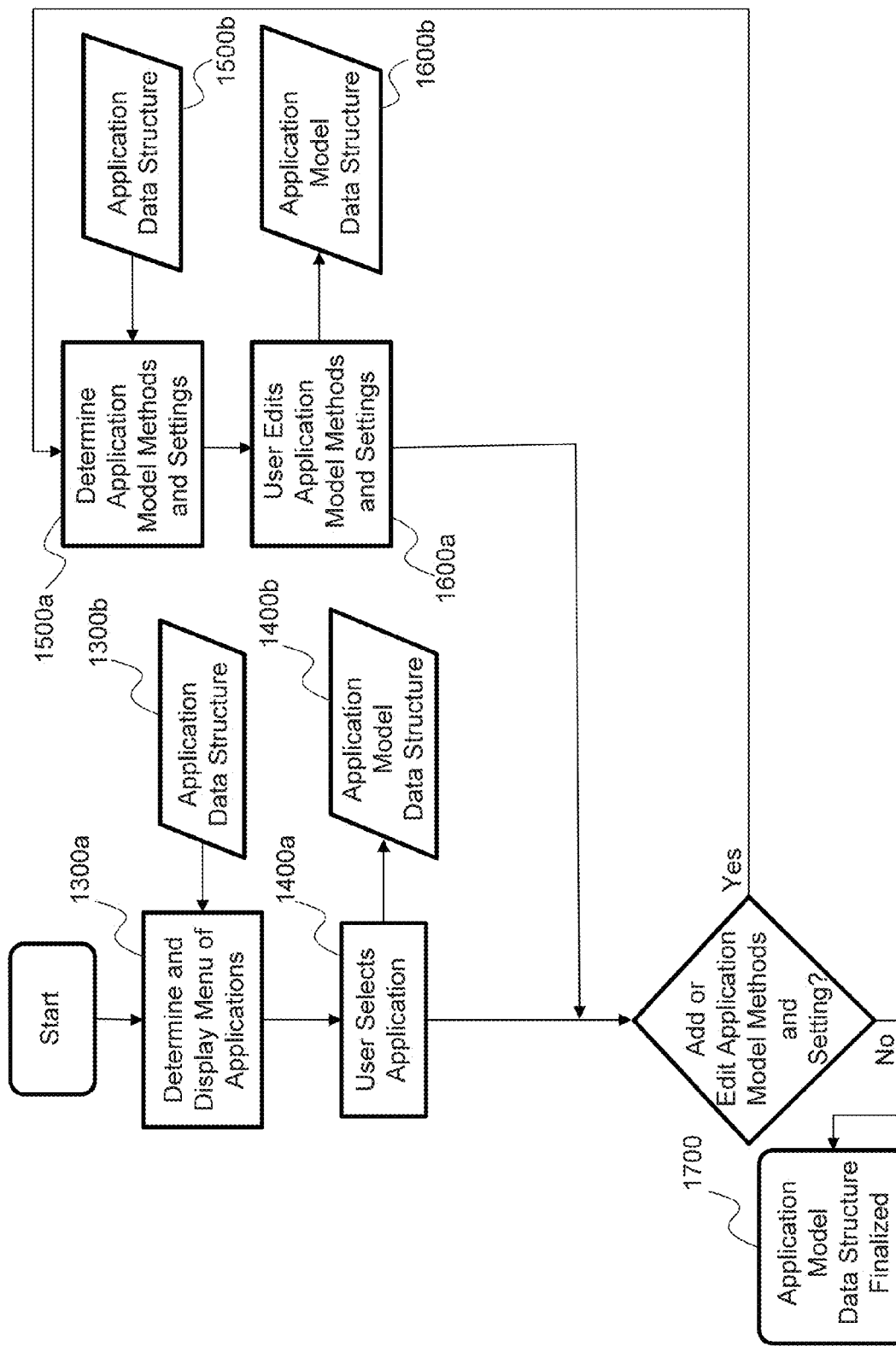
FIG. 22 illustrates an exemplary flowchart of method steps for interpreting an application data structure for generating and maintaining an application model tree, context menu, and settings window, according to aspects of the present disclosure.

FIG. 22 illustrates an exemplary flowchart of method steps for interpreting an application data structure for generating and maintaining an application model tree, context menu, and settings window in a multiphysics modeling system. The interpretation method can further be applied to generate an application model data structure based on settings specified by a user of a multiphysics modeling system. At step 1300*a*, a list of applications are determined and displayed from a set of available application data structures 1300*b*. Next, at step 1400*a*, a user can select an application from a displayed menu list, which then adds the application model to an application model data structure 1400*b*.

The method then proceeds to the logical decision box where a decision is made to add or edit application model methods and setting. If the decision is negative, the application model data structure is finalized at step 1700. If the decision is positive, the process proceeds to step 1500*a*, where an application user interface including application model settings and methods is determined and displayed 1500*a* based on the definition of application features available in the application data structure 1500*b*. Next, at step 1600*a*, a system user can edit the application model settings and methods. The default settings and the changed setting are then stored in the modified application model data structure 1600*b*. Then, if no more application model methods or settings are to be added or edited, the application model data structure is finalized in step 1700.

In a later method step, the application model data structure is then interpreted in a multiphysics modeling system that generates the simulation results for the model. These simulation results can be displayed in an output form.

Figure 23:
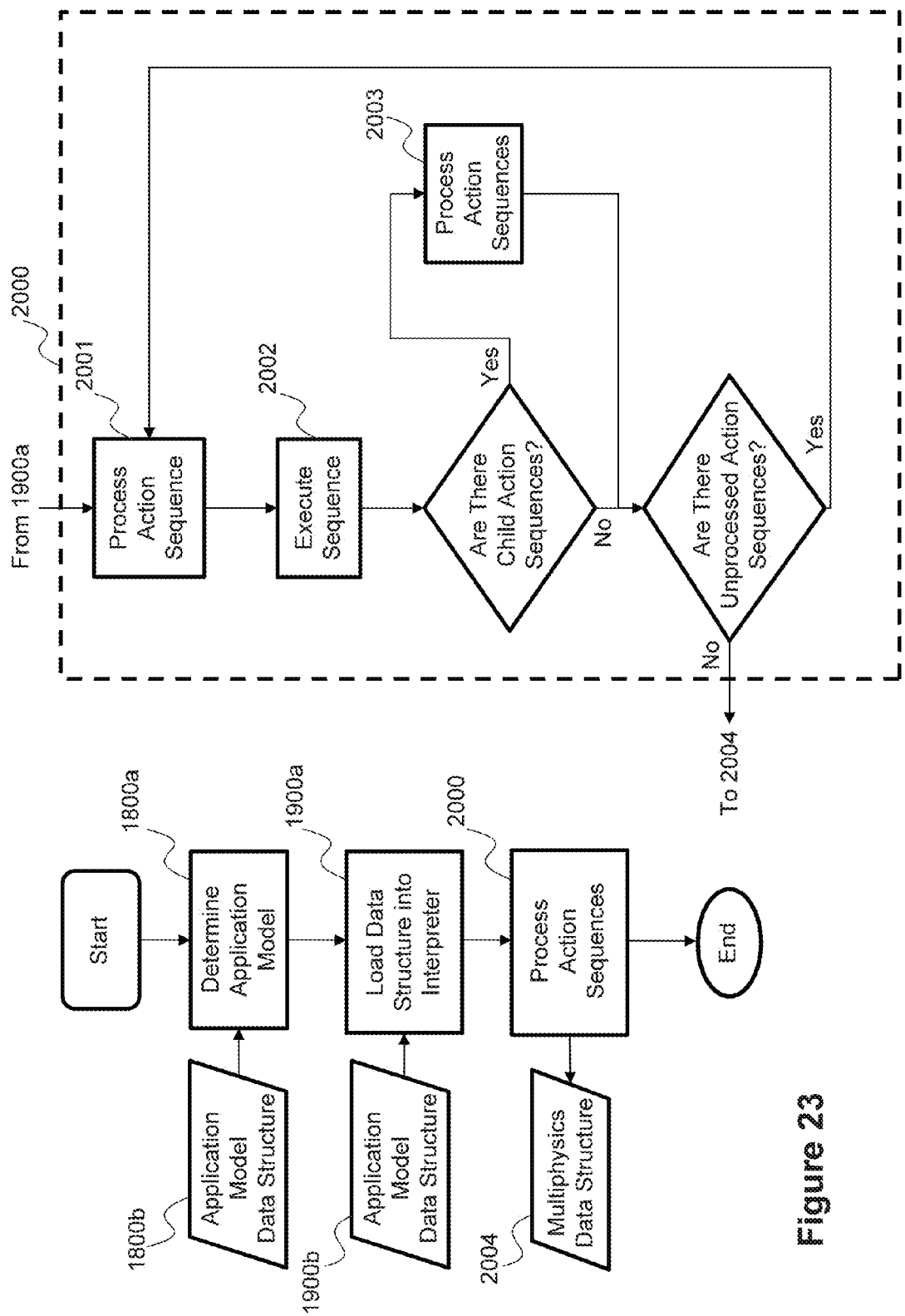
FIG. 23 illustrates an exemplary flowchart of method steps for interpreting an application model data structure, according to aspects of the present disclosure.

Referring now to FIG. 23, an exemplary flowchart is illustrated of method steps for interpreting an application model data structure and generating a multiphysics model data structure that includes a model object. The method illustrated is for the steps prior to discretizing and solving the equations in a multiphysics modeling system. At step 1800*a*, an application model can be determined from an application model data structure 1800*b*. Next, at step 1900*a*, the application model data structure 1900*b* is loaded to the interpreter. Then, at step 2000, execution sequences from the application model data structure are processed. At steps 2001 and 2002, an execution sequence can be processed and executed. In addition, child execution sequences can also be processed at step 2003. When all execution sequences have been processed, a multiphysics model data structure may be generated at step 2004.

According to certain aspects of the present disclosure, an Alternative Embodiment A is a system for generating a modified application data structure for modeling physical systems. The modified application data structure is generated from guided user inputs received through one or more application builder wizard graphical user interfaces. The system comprises one or more modeling system processing units, one or more user input devices, optionally a display device, and/or one or more memory devices. The one or more modeling processing units are adapted, during use, to embed a pre-determined or a user-selected multiphysics model data structure in an initial application data structure. The multiphysics model data structure comprises data representing one or more models of physical systems. Each model of a physical system represents physical phenomena and/or physical processes. The multiphysics model data structure further comprises data representing at least one modeling operation for determining how to model and/or simulate the one or more models of physical systems. One or more new window forms are defined. In response to defining the one or more new window forms, window form data representing the defined one or more new window forms is added to the initial application data structure. One or more selections for application features from one or more user-selectable application feature options displayed in one or more of the application builder wizard graphical user interfaces are received. In response to receiving the one or more selections, application feature data corresponding to the received one or more selections is added. The application feature data represents one or more application features for the one or more new window forms. The application feature data is added to the initial application data structure to create a modified application data structure that further includes the window form data. Each added application feature comprises one or more of (i) first data representing at least one widget included in at least one of the new window forms, (ii) second data representing at least one form feature included in at least one of the new window forms, and/or (iii) third data representing at least one command sequence initiated through the at least one widget included in at least one new window form. The at least one form feature comprises one or more fields for specifying input data and/or output data and/or presentation format of input and/or output data. A command sequence comprises data specifying a sequence of operations to be carried out when executing an application defined by the modified application data structure. The at least one widget is linked to the command sequence such that selection of the at least one widget, during execution of the application, is operable to initiate the command sequence. The command sequence includes execution of at least one operation for the one or more models of physical systems defined in the embedded multiphysics model data structure. A modified application data structure is generated and stored in the one or more memory devices. The generated modified application data structure provides, when executed, a customized modeling of the physical systems in response to customized user inputs received via the one or more new window forms and the one or more application features for the one or more new window forms.

An Alternative Embodiment B includes the aspects of Alternative Embodiment A and further including that the one or more new window forms are defined based on the receipt of one or more new window selections from a list of one or more displayed user-selectable window form options.

An Alternative Embodiment C includes the aspects of any one of the systems of Alternative Embodiments A or B and further includes that the at least one widget is a plurality of widgets defining a widget collection.

An Alternative Embodiment D includes the aspects of any one of the systems of Alternative Embodiments A to C and further includes that the at least one widget comprises data specifying an input field linked to a parameter in the multiphysics model data structure embedded in the modified application data structure.

An Alternative Embodiment E includes the aspects of any one of the systems of Alternative Embodiments A to D and further includes that the widget collection comprises an input field, the first data representing the input field, the first data further representing an input label and an input units label describing an expected user input for the input field.

An Alternative Embodiment F includes the aspects of any one of the systems of Alternative Embodiments A to E and further includes that the widget collection, including the input field, the input label, and the input units label, is displayed in a preview in one of the one or more application builder wizard graphical user interfaces, the display occurring in response to one of the one or more selections including the at least one widget collection.

An Alternative Embodiment G includes the aspects of any one of the systems of Alternative Embodiments A to F and further includes that a user selection is received for a modeling operation that sets an input parameter for modeling the physical systems, data representing the user selection for the modeling operation being included in the generated modified application data structure such that, when executed, provides a customized application for modeling the physical systems, the customized application including the selected modeling operation, the widget collection being linked to the modeling operation.

An Alternative Embodiment H includes the aspects of any one of the systems of Alternative Embodiments A to G and further includes that the at least one form feature is a plurality of forms that define a form collection feature.

An Alternative Embodiment I includes the aspects of any one of the systems of Alternative Embodiments A to H and further includes that the at least one form feature and the at least one widget are a combo box that displays a list of choices on a graphical user interface displaying one of the new window forms during execution of the generated modified application data structure, the list of choices corresponding to string data values.

An Alternative Embodiment J includes the aspects of any one of the systems of Alternative Embodiments A to I and further includes that the at least one widget feature includes a check-box widget and/or a button widget.

An Alternative Embodiment K includes the aspects of any one of the systems of Alternative Embodiments A to J and further includes that the at least one operation for the command sequence corresponds to a study to be applied to the one or more models defined in the embedded multiphysics model data structure.

An Alternative Embodiment L includes the aspects of any one of the systems of Alternative Embodiments A to K and further includes that the at least one operation corresponds to an update to an output form that includes an update to a plot corresponding to simulation results for the one or more models defined in the embedded multiphysics model data structure, the update to the plot being in response to execution of a series of operations for the study.

An Alternative Embodiment M includes the aspects of any one of the systems of Alternative Embodiments A to L and further includes that the at least one form feature, at least one widget, and/or the command sequence are added to the modified application data structure based on one or more received selections from one or more lists of user-selectable options displayed to a system user in the application builder wizard graphical user interface.

An Alternative Embodiment N includes the aspects of any one of the systems of Alternative Embodiments A to M and further includes that the at least one form feature is an output form or an output form collection feature, the output form or output form collection feature including a graphics widget and/or a graphics widget collection linked to one of a plot group, a geometry, and/or a mesh for the one or more models in the embedded multiphysics model data structure.

An Alternative Embodiment O includes the aspects of any one of the systems of Alternative Embodiments A to N and further includes that the graphics widget or graphics widget collection is configured to display data from an output declaration.

An Alternative Embodiment P includes the aspects of any one of the systems of Alternative Embodiments A to O and further includes that the system user is guided in creating new application features, the guiding including displaying to the system user one or more first lists of modeling operations and/or sequences of operations available in the embedded multiphysics model data structure; and in response to receiving a user selection of one or more modeling operations or sequences of operations from the first lists, the selected operations being displayed to the system user in one or more second lists, the displayed second lists showing modeling operations or sequences of operations linked to at least one of the new application features.

An Alternative Embodiment Q includes the aspects of any one of the systems of Alternative Embodiments A to P and further includes that the new application features include one or more of a new widget, widget collection, form feature, and/or form collection feature.

An Alternative Embodiment R includes the aspects of any one of the systems of Alternative Embodiments A to Q and further includes that at least one of the first list or the second list includes a display of indicia representing that the selected modeling operations and/or sequences of operations are linked to an input widget or input widget collection, an output widget or output widget collection, a graphics widget or graphics widget collection, and/or a button widget or button widget collection.

An Alternative Embodiment S includes the aspects of any one of the systems of Alternative Embodiments A to R and further includes that at least one of the one or more application builder wizard graphical user interfaces includes a preview displaying the new window form; and wherein in response to receiving the one or more selections, the preview is updated to display a representation of one or more of the added widgets or form features.

An Alternative Embodiment T includes the aspects of any one of the systems of Alternative Embodiments A to S and further includes that the preview is updated to display a representation of the at least one widget in the new window form.

An Alternative Embodiment U includes the aspects of any one of the systems of Alternative Embodiments A to T and further includes that the at least one widget is a graphics widget for displaying modeling results as plots, the preview being updated to display a representation of the graphics widget.

An Alternative Embodiment V includes the aspects of any one of the systems of Alternative Embodiments A to U and further includes that the one or more application feature options comprise a plurality of user-selectable options for modeling operations, the plurality of user-selectable options including one or more of defining input parameters, defining material properties, defining functions, defining physical properties, defining physical quantities, defining operators, defining result settings, defining variables, defining variable expressions, defining study settings, defining boundary conditions, defining initial conditions, and/or defining initial values for the physical systems being modeled.

An Alternative Embodiment W includes the aspects of any one of the systems of Alternative Embodiments A to V and further includes that the one or more application feature options comprise a plurality of user-selectable options for modeling operations, the plurality of user-selectable options including command sequences for one or more of building a geometry, displaying a geometry, building a mesh, displaying a mesh, computing numerical equations, displaying results, evaluating results, and/or plotting results.

An Alternative Embodiment X includes the aspects of any one of the systems of Alternative Embodiments A to W and further includes that the plurality of user-selectable options includes displaying modeling results as plots.

An Alternative Embodiment Y includes the aspects of any one of the systems of Alternative Embodiments A to X and further includes that the at least one widget is a button widget linked to a command sequence, the preview being updated to display a representation of the button widget linked to the command sequence.

According to certain aspects of the present disclosure, an Alternative Embodiment Z is a computer-implemented method for generating a modified application data structure for modeling physical systems. The modified application data structure is generated from guided user inputs received through one or more graphical user interfaces customized using an application builder wizard. The method comprises embedding, via one or more modeling system processing units, a pre-determined or user-selected multiphysics model data structure in an initial application data structure. The multiphysics model data structure comprises data representing one or more models of physical systems. Each model of a physical system representing physical phenomena and/or physical processes. The multiphysics model data structure further comprising data representing at least one modeling operation for determining how to model or simulate the one or more models of physical systems. In response to an input received via one or more input devices, one or more new window forms are defined. In response to defining the one or more new window forms, window form data representing the defined one or more new window forms are added to the initial application data structure via at least one of the one or more modeling system processing units. One or more selections for application features from one or more user-selectable application feature options displayed in one or more of the application builder wizard graphical user interfaces are receive via at least one of the one or more input devices. In response to receiving the one or more selections, application feature data corresponding to the received one or more selections are added via at least one of the one or more processing units. The application feature data represents one or more application features for the one or more new window forms. The application feature data is added to the initial application data structure to create a modified application data structure that further includes the window form data. Each added application feature comprises one or more of (i) first data representing at least one widget included in at least one of the new window forms, (ii) second data representing at least one widget collection included in at least one of the new window forms, (iii) third data representing at least one form feature included in at least one of the new window forms, (iv) fourth data representing at least one form collection feature included in at least one of the new window forms and/or (v) fifth data representing at least one command sequence initiated through the new window form. The at least one form feature or the at least one form collection feature comprises one or more fields for specifying input data and/or output data and/or presentation format of input and/or output data. The command sequence comprises data specifying a sequence of operations to be carried out when executing an application defined by the modified application data structure. The at least one widget or widget collection is linked to the command sequence such that selection of the at least one widget or widget collection, during execution of the application, is operable to initiate a command sequence. The command sequence includes execution of at least one operation for the one or more models of physical systems defined in the embedded multiphysics model data structure. The modified application data structure is generated via at least one of the one or more modeling processing units. The generated modified application data structure is stored on one or more memory devices of the multiphysics modeling system. The generated modified application data structure provides, when executed, a customized modeling of the physical systems in response to customized user inputs received via one or more new window forms and one or more application features for the one or more new window forms.

An Alternative Embodiment AA includes the aspects of the computer-implemented method of Alternative Embodiment Z and further includes that the at least one widget or the at least one widget collection includes a link to the command sequence. The at least one operation for the command sequence corresponds to a study to be applied to the one or more models defined in the embedded multiphysics model data structure. The least one operation further corresponds to an update to an output form including an update to a plot corresponding to the model defined in the embedded model data structure. The update to the plot is in response to execution of a sequence of operations for the study.

An Alternative Embodiment AB includes the any one of the aspects of the computer-implemented methods of Alternative Embodiment Z to AA and further includes that the at least one form feature is an output form feature. The output form feature includes a graphics widget or a graphics widget collection linked to one of a plot group, a geometry, and/or a mesh for the one or more models in the embedded multiphysics model data structure.

An Alternative Embodiment AC includes any one of the aspects of the computer-implemented methods of Alternative Embodiments Z to AB and further includes that the one or more new window forms are defined based on the receipt of one or more new window selections from a list of one or more displayed user-selectable window form options.

An Alternative Embodiment AD includes the aspects of any one of the computer-implemented methods of Alternative Embodiments Z to AC and further includes that the at least one widget comprises data specifying an input field linked to a parameter in the multiphysics model data structure embedded in the modified application data structure.

An Alternative Embodiment AE includes the aspects of any one of the computer-implemented methods of Alternative Embodiments Z to AD and further includes that the widget collection comprises an input field, the first data representing the input field, the first data further representing an input label and an input units label describing an expected user input for the input field.

An Alternative Embodiment AF includes the aspects of any one of the computer-implemented methods of Alternative Embodiments Z to AE and further includes that the widget collection, including the input field, the input label, and/or the input units label, is displayed in a preview in one of the one or more application builder wizard graphical user interfaces, the display occurring in response to one of the one or more selections including the at least one widget collection.

An Alternative Embodiment AG includes the aspects of any one of the computer-implemented methods of Alternative Embodiments Z to AF and further includes that a user selection is received for a modeling operation that sets an input parameter for modeling the physical systems, data representing the user selection for the modeling operation being included in the generated modified application data structure such that, when executed, provides a customized application for modeling the physical systems, the customized application including the selected modeling operation, the widget collection being linked to the modeling operation.

An Alternative Embodiment AH includes the aspects of any one of the computer-implemented methods of Alternative Embodiments Z to AG and further includes that the at least one form feature and/or the at least one widget are a combo box that displays a list of choices on a graphical user interface displaying one of the new window forms during execution of the generated modified application data structure, the list of choices corresponding to string data values.

An Alternative Embodiment AI includes the aspects of any one of the computer-implemented methods of Alternative Embodiments Z to AH and further includes that the at least one widget feature includes a check-box widget and/or a button widget.

An Alternative Embodiment AJ includes the aspects of any one of the computer-implemented methods of Alternative Embodiments Z to AI and further includes that the at least one operation for the command sequence corresponds to a study to be applied to the one or more models defined in the embedded multiphysics model data structure.

An Alternative Embodiment AK includes the aspects of any one of the computer-implemented methods of Alternative Embodiments Z to AJ and further includes that the at least one operation corresponds to an update to an output form that includes an update to a plot corresponding to simulation results for the one or more models defined in the embedded multiphysics model data structure, the update to the plot being in response to execution of a series of operations for the study.

An Alternative Embodiment AL includes the aspects of any one of the computer-implemented methods of Alternative Embodiments Z to AK and further includes that the at least one form feature, at least one widget, and/or the command sequence are added to the modified application data structure based on one or more received selections from one or more lists of user-selectable options displayed to a system user in the application builder wizard graphical user interface.

An Alternative Embodiment AM includes the aspects of any one of the computer-implemented methods of Alternative Embodiments Z to AL and further includes that the at least one form feature is an output form or an output form collection feature, the output form or output form collection feature including a graphics widget and/or a graphics widget collection linked to one of a plot group, a geometry, and/or a mesh for the one or more models in the embedded multiphysics model data structure.

An Alternative Embodiment AN includes the aspects of any one of the computer-implemented methods of Alternative Embodiments Z to AM and further includes that the graphics widget or graphics widget collection is configured to display data from an output declaration.

An Alternative Embodiment AO includes the aspects of any one of the computer-implemented methods of Alternative Embodiments Z to AN and further includes that the system user is guided in creating new application features, the guiding including displaying to the system user one or more first lists of modeling operations and/or sequences of operations available in the embedded multiphysics model data structure; and in response to receiving a user selection of one or more modeling operations or sequences of operations from the first lists, the selected operations being displayed to the system user in one or more second lists, the displayed second lists showing modeling operations or sequences of operations linked to at least one of the new application features.

An Alternative Embodiment AP includes the aspects of any one of the computer-implemented methods of Alternative Embodiments Z to AO and further includes that the new application features include one or more of a new widget, widget collection, form feature, and/or form collection feature.

An Alternative Embodiment AQ includes the aspects of any one of the computer-implemented methods of Alternative Embodiments Z to AP and further includes that at least one of the first list and/or the second list includes a display of indicia representing that the selected modeling operations and/or sequences of operations are linked to an input widget or input widget collection, an output widget or output widget collection, a graphics widget or graphics widget collection, and/or a button widget or button widget collection.

An Alternative Embodiment AR includes the aspects of any one of the computer-implemented methods of Alternative Embodiments Z to AQ and further includes that at least one of the one or more application builder wizard graphical user interfaces includes a preview displaying the new window form; and wherein in response to receiving the one or more selections, the preview is updated to display a representation of one or more of the added widgets or form features.

An Alternative Embodiment AS includes the aspects of any one of the computer-implemented methods of Alternative Embodiments Z to AR and further includes that the preview is updated to display a representation of the at least one widget in the new window form.

An Alternative Embodiment AT includes the aspects of any one of the computer-implemented methods of Alternative Embodiments Z to AS and further includes that the at least one widget is a graphics widget for displaying modeling results as plots, the preview being updated to display a representation of the graphics widget.

An Alternative Embodiment AU includes the aspects of any one of the computer-implemented methods of Alternative Embodiments Z to AT and further includes that the one or more application feature options comprise a plurality of user-selectable options for modeling operations, the plurality of user-selectable options including one or more of defining input parameters, defining material properties, defining functions, defining physical properties, defining physical quantities, defining operators, defining result settings, defining variables, defining variable expressions, defining study settings, defining boundary conditions, defining initial conditions, and/or defining initial values for the physical systems being modeled.

An Alternative Embodiment AV includes the aspects of any one of the computer-implemented methods of Alternative Embodiments Z to AT and further includes that the one or more application feature options comprise a plurality of user-selectable options for modeling operations, the plurality of user-selectable options including command sequences for one or more of building a geometry, displaying a geometry, building a mesh, displaying a mesh, computing numerical equations, displaying results, evaluating results, and/or plotting results.

An Alternative Embodiment AW includes the aspects of any one of the computer-implemented methods of Alternative Embodiments Z to AV and further includes that the plurality of user-selectable options includes displaying modeling results as plots.

An Alternative Embodiment AX includes the aspects of any one of the computer-implemented methods of Alternative Embodiments Z to AW and further includes that the at least one widget is a button widget linked to a command sequence, the preview being updated to display a representation of the button widget linked to the command sequence.

Each of the aspects described above and obvious variations thereof are contemplated as falling within the spirit and scope of the claimed invention, which is set forth in the following claims.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The mere fact that certain measures are recited in mutually different dependent claims does not indicate that a combination of these measures cannot be used to advantage.

What is claimed is:

1. A system adapted to generate a modified application data structure for modeling physical systems, the modified application data structure being generated from guided user inputs received through one or more application builder wizard graphical user interfaces, the system comprising: one or more modeling system processing units, one or more user input devices, optionally a display device, and one or more memory devices, the one or more modeling processing units being adapted, during use, to embed a pre-determined or a user-selected multiphysics model data structure in an initial application data structure, wherein the multiphysics model data structure comprises data representing one or more models of physical systems, each model of a physical system representing physical phenomena and/or physical processes, the multiphysics model data structure further comprising data representing at least one modeling operation for determining how to model or simulate the one or more models of physical systems, define one or more new window forms, in response to defining the one or more new window forms, add window form data representing the defined one or more new window forms to the initial application data structure, receive one or more selections for application features from one or more user-selectable application feature options displayed in one or more of the application builder wizard graphical user interfaces, and in response to receiving the one or more selections, add application feature data corresponding to the received one or more selections, the application feature data representing one or more application features for the one or more new window forms, the application feature data being added to the initial application data structure to create a modified application data structure that further includes the window form data, each added application feature comprising one or more of (i) first data representing at least one widget included in at least one of the new window forms, (ii) second data representing at least one form feature included in at least one of the new window forms, and/or (iii) third data representing at least one command sequence initiated through the at least one widget included in at least one new window form, wherein the at least one form feature comprises one or more fields for specifying input data and/or output data and/or presentation format of input and/or output data, and wherein a command sequence comprises data specifying a sequence of operations to be carried out when executing an application defined by the modified application data structure, and wherein the at least one widget is linked to the command sequence such that selection of the at least one widget, during execution of the application, is operable to initiate the command sequence, the command sequence including execution of at least one operation for the one or more models of physical systems defined in the embedded multiphysics model data structure, whereby a modified application data structure is generated and stored in the one or more memory devices, the generated modified application data structure providing, when executed, a customized modeling of the physical systems in response to customized user inputs received via the one or more new window forms and the one or more application features for the one or more new window forms.

2. The system of claim 1, wherein the at least one widget is a plurality of widgets defining a widget collection.

3. The system of claim 1, wherein the at least one widget comprises data specifying an input field linked to a parameter in the multiphysics model data structure embedded in the modified application data structure.

4. The system of claim 2, wherein the widget collection comprises an input field, the first data representing the input field, the first data further representing an input label and an input units label describing an expected user input for the input field.

5. The system of claim 2, wherein the widget collection, including the input field, the input label, and the input units label, is displayed in a preview in one of the one or more application builder wizard graphical user interfaces, the display occurring in response to one of the one or more selections including the at least one widget collection.

6. The system of claim 2, wherein a user selection is received for a modeling operation that sets an input parameter for modeling the physical systems, data representing the user selection for the modeling operation being included in the generated modified application data structure such that, when executed, provides a customized application for modeling the physical systems, the customized application including the selected modeling operation, the widget collection being linked to the modeling operation.

7. The system of claim 1, wherein the at least one form is a plurality of forms that define a form collection.

8. The system of claim 1, wherein the at least one form feature and the at least one widget are a combo box that displays a list of choices on a graphical user interface displaying one of the new window forms during execution of the generated modified application data structure, the list of choices corresponding to string data values.

9. The system of claim 1, wherein the at least one widget feature includes one of a check-box widget or a button widget.

10. The system of claim 1, wherein the at least one operation for the command sequence corresponds to a study to be applied to the one or more models defined in the embedded multiphysics model data structure.

11. The system of claim 10, wherein the at least one operation corresponds to an update to an output form that includes an update to a plot corresponding to simulation results for the one or more models defined in the embedded multiphysics model data structure, the update to the plot being in response to execution of a series of operations for the study.

12. The system of claim 1, wherein the at least one form feature, at least one widget, and/or the command sequence are added to the modified application data structure based on one or more received selections from one or more lists of user-selectable options displayed to a system user in the application builder wizard graphical user interface.

13. The system of claim 1, wherein the at least one form feature is an output form or an output form collection feature, the output form or output form collection feature including a graphics widget or a graphics widget collection linked to one of a plot group, a geometry, or a mesh for the one or more models in the embedded multiphysics model data structure.

14. The system of claim 13, wherein the graphics widget or graphics widget collection is configured to display data from an output declaration.

15. The system of claim 1, wherein the system user is guided in creating new application features, the guiding including displaying to the system user one or more first lists of modeling operations and/or sequences of operations available in the embedded multiphysics model data structure; and in response to receiving a user selection of one or more modeling operations or sequences of operations from the first lists, the selected operations being displayed to the system user in one or more second lists, the displayed second lists showing modeling operations or sequences of operations linked to at least one of the new application features.

16. The system of claim 15, wherein the new application features include one or more of a new widget, widget collection, form feature, or form collection feature.

17. The system of claim 15, wherein at least one of the first list or the second list includes a display of indicia representing that the selected modeling operations or sequences of operations are linked to an input widget or input widget collection, an output widget or output widget collection, a graphics widget or graphics widget collection or a button widget or button widget collection.

18. The system of claim 1, wherein at least one of the one or more application builder wizard graphical user interfaces includes a preview displaying the new window form; and wherein in response to receiving the one or more selections, the preview is updated to display a representation of one or more of the added widgets or form features.

19. The system of claim 18, wherein the preview is updated to display a representation of the at least one widget in the new window form.

20. The system of claim 19, wherein the at least one widget is a graphics widget for displaying modeling results as plots, the preview being updated to display a representation of the graphics widget.

21. The system of claim 1, wherein the one or more application feature options comprise a plurality of user-selectable options for modeling operations, the plurality of user-selectable options including one or more of defining input parameters, defining material properties, defining functions, defining physical properties, defining physical quantities, defining operators, defining result settings, defining variables, defining variable expressions, defining study settings, defining boundary conditions, defining initial conditions, or defining initial values for the physical systems being modeled.

22. The system of claim 1, wherein the one or more application feature options comprise a plurality of user-selectable options for modeling operations, the plurality of user-selectable options including command sequences for one or more of building a geometry, displaying a geometry, building a mesh, displaying a mesh, computing numerical equations, displaying results, evaluating results, or plotting results.

23. The system of claim 22, wherein the plurality of user-selectable options includes displaying modeling results as plots.

24. The system of claim 1, wherein the at least one widget is a button widget linked to a command sequence, the preview being updated to display a representation of the button widget linked to the command sequence.

25. A computer-implemented method for generating a modified application data structure for modeling physical systems, the modified application data structure being generated from guided user inputs received through one or more graphical user interfaces customized using an application builder wizard, the method comprising:
    embed, via one or more modeling system processing units, a pre-determined or user-selected multiphysics model data structure in an initial application data structure, wherein the multiphysics model data structure comprises data representing one or more models of physical systems, each model of a physical system representing physical phenomena and/or physical processes, the multiphysics model data structure further comprising data representing at least one modeling operation for determining how to model or simulate the one or more models of physical systems;

in response to an input received via one or more user input devices, define one or more new window forms;

in response to defining the one or more new window forms, add, via at least one of the one or more modeling system processing units, window form data representing the defined one or more new window forms to the initial application data structure;

receive, via at least one of the one or more input devices, one or more selections for application features from one or more user-selectable application feature options displayed in one or more of the application builder wizard graphical user interfaces;

in response to receiving the one or more selections, add, via at least one of the one or more processing units, application feature data corresponding to the received one or more selections, the application feature data representing one or more application features for the one or more new window forms, the application feature data being added to the initial application data structure to create a modified application data structure that further includes the window form data, each added application feature comprising one or more of (i) first data representing at least one widget included in at least one of the new window forms, (ii) second data representing at least one widget collection included in at least one of the new window forms, (iii) third data representing at least one form feature included in at least one of the new window forms, (iv) fourth data representing at least one form collection feature included in at least one of the new window forms and/or (v) fifth data representing at least one command sequence initiated through the new window form, wherein the at least one form feature or the at least one form collection feature comprises one or more fields for specifying input data and/or output data and/or presentation format of input and/or output data, and wherein the command sequence comprises data specifying a sequence of operations to be carried out when executing an application defined by the modified application data structure, and wherein the at least one widget or widget collection is linked to the command sequence such that selection of the at least one widget or widget collection, during execution of the application, is operable to initiate a command sequence, the command sequence including execution of at least one operation for the one or more models of physical systems defined in the embedded multiphysics model data structure; and generating the modified application data structure via at least one of the one or more modeling processing units, the generated modified application data structure being stored on one or more memory devices of the multiphysics modeling system, the generated modified application data structure providing, when executed, a customized modeling of the physical systems in response to customized user inputs received via one or more new window forms and one or more application features for the one or more new window forms.

26. The method of claim 25, wherein the at least one widget or the at least one widget collection includes a link to the command sequence, the at least one operation for the command sequence corresponding to a study to be applied to the one or more models defined in the embedded multiphysics model data structure, the at least one operation further corresponding to an update to an output form including an update to a plot corresponding to the model defined in the embedded model data structure, the update to the plot being in response to execution of a sequence of operations for the study.

27. The method of claim 25, wherein the at least one form feature is an output form feature, the output form feature including a graphics widget or a graphics widget collection linked to one of a plot group, a geometry, or a mesh for the one or more models in the embedded multiphysics model data structure.

* * * * *